United States Patent
Torgersrud

(10) Patent No.: US 10,003,663 B2
(45) Date of Patent: Jun. 19, 2018

(54) INMATE NETWORK PRIMING

(71) Applicant: Telmate LLC, San Francisco, CA (US)

(72) Inventor: Richard Torgersrud, San Francisco, CA (US)

(73) Assignee: Intelmate LLC, San Francisco, CA (US)

( * ) Notice: Subject to any disclaimer, the term of this patent is extended or adjusted under 35 U.S.C. 154(b) by 627 days.

(21) Appl. No.: 13/842,031

(22) Filed: Mar. 15, 2013

(65) Prior Publication Data
US 2014/0280559 A1 Sep. 18, 2014

(51) Int. Cl.
G06F 15/16 (2006.01)
H04L 29/08 (2006.01)
H04L 29/06 (2006.01)
H04M 1/2745 (2006.01)

(52) U.S. Cl.
CPC .............. *H04L 67/22* (2013.01); *H04L 63/08* (2013.01); *H04L 63/102* (2013.01); *H04L 67/20* (2013.01); *H04L 67/306* (2013.01); *H04M 1/274516* (2013.01)

(58) Field of Classification Search
CPC ...... H04L 63/30; G06F 21/32; G06K 9/00221
USPC ........................................................ 709/204
See application file for complete search history.

(56) References Cited

U.S. PATENT DOCUMENTS

| | | | |
|---|---|---|---|
| 7,904,511 B2 * | 3/2011 | Ryan .................... | G06Q 50/01 709/204 |
| 2007/0071206 A1 * | 3/2007 | Gainsboro .......... | H04M 3/2281 379/168 |
| 2009/0177744 A1 * | 7/2009 | Marlow ................ | G06Q 10/10 709/204 |
| 2010/0299761 A1 * | 11/2010 | Shapiro ............... | G06Q 10/107 726/28 |
| 2011/0209192 A1 * | 8/2011 | LeClerc Greer ........ | G06F 21/32 726/1 |
| 2013/0054012 A1 * | 2/2013 | Holman ................ | G06Q 10/10 700/232 |
| 2013/0121540 A1 * | 5/2013 | Garcia ............... | G06K 9/00288 382/118 |
| 2014/0023246 A1 * | 1/2014 | Bolding ............. | G06K 9/00885 382/118 |
| 2014/0254890 A1 * | 9/2014 | Bergman ............. | G08B 13/248 382/118 |

FOREIGN PATENT DOCUMENTS

CN         102708606 B   *   9/2013

* cited by examiner

*Primary Examiner* — Kevin Bates
*Assistant Examiner* — Emad Siddiqi
(74) *Attorney, Agent, or Firm* — FBFK PC

(57) ABSTRACT

A method for network priming for an inmate of a controlled facility includes receiving authentication credentials for the inmate to access a third party social network, importing social network contacts from the third party social network, filtering the social network contacts for prohibited contacts, presenting the inmate with the social network contacts, receiving, from the inmate, a selection of social network contacts to obtain selected social network contacts, and populating a secure social network list of the inmate with the selected social network contacts.

22 Claims, 11 Drawing Sheets

INMATE NETWORK PRIMING

CROSS-REFERENCE TO RELATED APPLICATIONS

This application is related to U.S. patent application Ser. No. 13/438,940 filed on Apr. 4, 2012, entitled "Secure Social Network." U.S. patent application Ser. No. 13/438,940 is incorporated by reference in its entirety.

BACKGROUND

Controlled facilities, such as a jail, prison, secure detention environments, detention facility, secured hospital, or addiction treatment facility, house large populations of individuals in confinement, which presents unique administrative challenges. In such detention environments, detained individuals, such as prisoners, offenders, convicts, military personnel, patients, government cleared personnel, or other detainees, frequently desire to communicate with individuals outside the detention environment such as friends or family members.

SUMMARY

In general, in one aspect, embodiments relate to a method for network priming for an inmate of a controlled facility. The method includes receiving authentication credentials for the inmate to access a third party social network, importing social network contacts from the third party social network, filtering the social network contacts for prohibited contacts, presenting the inmate with the social network contacts, receiving, from the inmate, a selection of social network contacts to obtain selected social network contacts, and populating a secure social network list of the inmate with the selected social network contacts.

In general, in one aspect, embodiments relate to a system for network priming for an inmate of a controlled facility. The system includes a computer processor, a database server, and a network application that executes on the computer processor. The database server includes an inmate account including a secure social network list. The network application includes a controlled setup module. The controlled setup module is configured to receive authentication credentials for the inmate to access a third party social network, import social network contacts from the third party social network, filter the social network contacts for prohibited contacts, present the inmate with the social network contacts, receive, from the inmate, a selection of social network contacts obtain selected social network contacts, and populate a secure social network list in the inmate account with the plurality of selected social network contacts.

In general, in one aspect, embodiments relate to a non-transitory computer readable medium for network priming for an inmate of a controlled facility. The non-transitory computer readable medium includes computer readable program code for receiving authentication credentials for the inmate to access a third party social network, importing social network contacts from the third party social network, filtering the social network contacts for prohibited contacts, presenting the inmate with the social network contacts, receiving, from the inmate, a selection of social network contacts to obtain selected social network contacts, and populating a secure social network list of the inmate with the selected social network contacts.

In general, in one aspect, embodiments relate to a method for network priming for an inmate of a controlled facility. The method includes importing mobile device contacts from a mobile device used by the inmate, filtering the mobile device contacts for prohibited contacts, presenting the inmate with the mobile device contacts, receiving, from the inmate, a selection of mobile device contacts to obtain selected telephone contacts, and populating a telephone list of the inmate with the plurality of selected telephone contacts.

Other aspects of the invention will be apparent from the following description and the appended claims.

DETAILED DESCRIPTION

Figure 1:
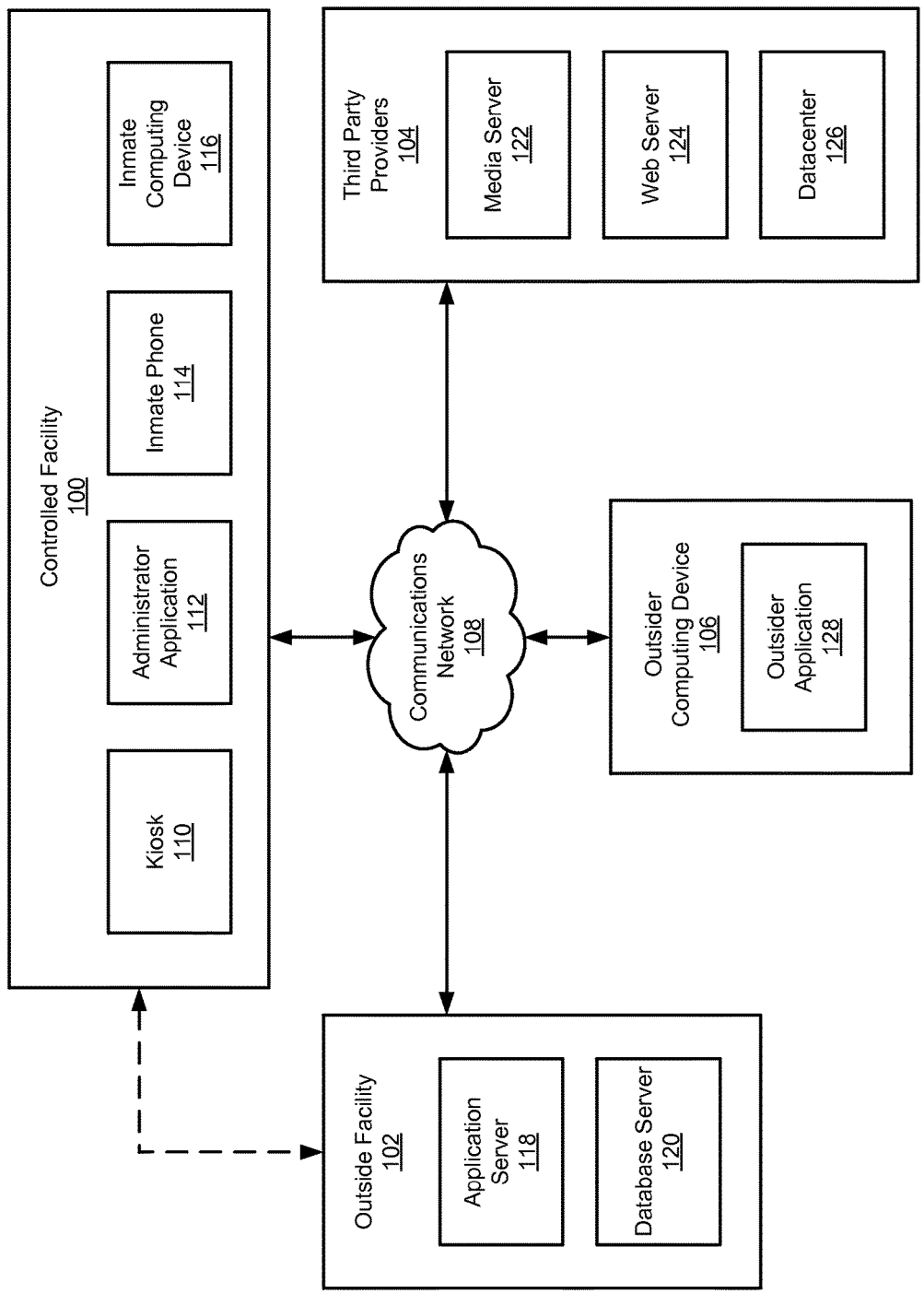
FIGS. 1-7 show schematic diagrams of a system in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for network priming for an inmate of a controlled facility. Specifically, embodiments of the invention control which contacts an inmate can have in a secure social network. More specifically, social network contacts of the inmate are imported from a third party social network of the inmate. The social network contacts are filtered for prohibited contacts. In other words, contacts that the inmate does not have permission to communicate with are removed from the social network contacts. The remaining contacts are approved for communication. The inmate may be presented with remaining contacts, and select, from the remaining contacts, which contacts to add from the social network. Thus, those contacts are added to the inmate social network.

One or more embodiments may further add contacts from an inmate's mobile device. For example, if the inmate enters the controlled facility with a mobile phone, one or more embodiments add approved contacts in the mobile phone to the inmate's telephone network and/or social network.

Embodiments of the invention may include interactions with a secure social network. In one or more embodiments of the invention, a secure social network is a network application that facilitates and secures the exchange or transmission of information between two or more parties in which at least one of those parties is subject to special security or law enforcement restrictions or otherwise resides in, or is subject to the controls of a controlled facility. Exchanged or transmitted information may be member generated, such as a photo or a video message, or it may be member-curated, such as a news headline, a famous quote, or a sports score.

FIG. 1 shows a diagram of a system in accordance with one or more embodiments of the invention. As shown in FIG. 1, the system includes a controlled facility (100), an outside facility (102), third party providers (104), and an outsider computing device (106) each communicatively coupled to a communications network (108). The controlled facility (100) may include, but is not limited to, a kiosk (110), an administrator application (112), an inmate phone (114), and an inmate computing device (116). The outside facility (102) may include an application server (118) and a database server (120). The third party providers (104) may include a media server (122), a web server (124), and a datacenter (126). The outsider computing device (106) may include an outsider application (128).

In one or more embodiments of the invention, a controlled facility (100) is an access-restricted location. Examples of controlled facilities (e.g., controlled facility (100)) include, but are not limited to, detention environments (e.g., jails, prisons, etc.), immigration detention centers, military centers, government secure sites, law enforcement holding structures, secure business complexes, and psychiatric hospitals.

In one or more embodiments of the invention, an inmate is a person within a controlled facility (100) who is subject to one or more restrictions, primarily to his or her freedom or rights. Examples of inmates include, but are not limited to, prisoners, wards of the state, parolees, employees working in a secure business complex, temporary or long-term internees, patients, military personnel, uncharged suspects, and refugees. Inmate restrictions may be part of a court-imposed sentence on an inmate, while others may be specific to the controlled facility (100) in which the inmate resides. Restrictions may include limitations on an inmate's physical movement (i.e., physical restrictions) and limitations on the inmate's ability to communicate (i.e., communication restrictions). Communication restrictions include inmate use restrictions, inmate target restrictions, and device use restrictions.

In one or more embodiments of the invention, inmate use restrictions are limitations on an inmate's general ability to communicate with visitors and/or outsiders. Inmate use restrictions may include, for example, periods of time in which an inmate is not allowed to communicate with outsiders or visitors (e.g., between 10 PM and 8 AM, during an imposed one-week punitive period, etc.) and limitations based on lack of funds (e.g., insufficient commissary account balance to initiate a communication).

In one or more embodiments of the invention, inmate target restrictions are limitations on the target or source of a communication with the inmate. Inmate target restrictions may be specific outsiders or visitors with whom the inmate is not allowed to communicate (e.g., the victim of a crime perpetrated by the inmate, etc.). Inmate target restrictions may also include types of people with whom the inmate is not allowed contact (e.g., outsiders who are ex-cons, minors under the age of 18, etc.).

In one or more embodiments of the invention, device use restrictions are restrictions based on the condition or state of the communication device used by the inmate. Device use restrictions include, for example, limitations based on the location of the inmate's mobile device, limitations imposed based on a determination that the device has been tampered with, etc.

In one or more embodiments of the invention, an outsider is a person outside the controlled facility (100) who may be the source or target of a communication with an inmate. An outsider who enters the controlled facility (100) for the purpose of communicating with an inmate is referred to as a visitor.

In one or more embodiments of the invention, the kiosk (110) is a computing system with functionality to facilitate communication between an inmate and a visitor or outsider. Such communication facilitation may include creating a system identity data item or secure social networking account, adding or importing contact information for outsiders with whom the inmate wishes to communicate, uploading media (e.g., photos, videos, audio, and text) to, or viewing media from, a secure social network, sending or receiving messages or other media, acting as an endpoint for voice and video communication between an inmate and a visitor or outsider, scheduling a communication, and managing a commissary or communications account. Further detail about kiosks (e.g., kiosk (110)) is provided in FIG. 2, FIG. 5A, FIG. 5B, and FIG. 6.

In one or more embodiments of the invention, the administrator application (112) is a process or group of processes executing on a computing system with functionality to enable an administrator to create, remove, and/or enforce one or more restrictions on an inmate, outsider, or device. In one or more embodiments of the invention, an administrator is a person associated with the controlled facility charged with enforcing one or more restrictions. Examples of administrators include, but are not limited to, prison guards, orderlies, wardens, prison staff, jailers, information technology technicians, system administrators, and law enforcement agents. Using the administrator application, an administrator may retrieve or alter the identity data item and/or secure social network account of an inmate, visitor, or outsider. Further detail about the administrator application (112) is provided in FIG. 2.

In one or more embodiments of the invention, the inmate phone (114) is a device with functionality to send and receive audio communications between an inmate and an outsider or visitor. In one or more embodiments of the invention, the inmate phone (114) is a stationary (i.e., non-mobile) device. Further, a single inmate phone (114) may be used by more than one inmate. Further detail about the inmate phone (114) is provided in FIG. 2.

In one or more embodiments of the invention, the inmate computing device (116) is a computing device with functionality to enable an inmate to communicate with a visitor or outsider. Specifically, the inmate computing device (116) may be used to send or receive text messages and/or initiate or receive voice or video calls. In one or more embodiments of the invention, the inmate computing device (116) also enables an inmate to access a secure social network. Specifically, the inmate computing device (116) may be used to upload media to, or view media from, a secure social network account of the inmate or another secure social network member. In one or more embodiments of the invention, the inmate computing device (116) is a mobile computing device (e.g., a smartphone, a laptop, a tablet, etc.). Further detail about the inmate computing device (116) is provided in FIG. 2 and FIG. 6.

In one or more embodiments of the invention, the elements within the controlled facility (100) are communicatively coupled to the communications network (108). In one or more embodiments of the invention, the communications network (108) is a collection of computing systems and other hardware interconnected by communication channels. The communications network (108) may include networks that are exclusively or primarily used for a single type of communication, such as a telephone network (e.g., Plain Old Telephone System (POTS)), and/or networks used for a wide array of communication types, such as the Internet through Voice over IP (VoIP). Communication channels used by the communications network (108) may include, for example, telephone lines, networking cables, wireless signals, radio waves, etc. Fees charged and payments received by the provider(s) of the communications network (108) may involve multiple parties, including a service provider of the outside facility (102), the management of the controlled facility (100), and provider(s) of the communications network (108). In one or more embodiments of the invention, fees may be split between multiple parties based on the terms of underlying agreements or contracts between the parties. Further, rebates, reimbursements, and/or refunds may be afforded to and paid to the management of the controlled facility (100) based on the terms of underlying agreements or contracts between the parties. For example, the management of the controlled facility (100) may receive a rebate from the service provider of the services provided to inmates based on such factors as the volume of use, the dollar amount, and/or the frequency of use.

In one or more embodiments of the invention, the outside facility (102) is a group of computing systems located outside of the controlled facility (100). Specifically, the outside facility (102) may house system elements with functionality to facilitate communication between inmates and outsiders, access communication data between inmates and outsiders, and enforce one or more restrictions imposed on inmates and inmate communications. In one or more embodiments of the invention, the outside facility (102) is connected directly to the controlled facility (100) bypassing a generally accessible communications network (communications network (108)). One or more of the components within the outside facility (102) may alternatively be located within the controlled facility (100) or within the third party providers (104).

In one or more embodiments of the invention, the application server (118) is a computing system with functionality to authenticate an inmate, outsider, administrator, reviewer, or investigator for access to system functionality (e.g., initiating voice or video calls, sending text messages, etc.) or data stored on the database server (120) (e.g., inmate identities, communications between inmates and outsiders, etc.). The application server may authenticate inmates, outsiders, administrators, reviewers, and/or investigators using passwords, biometric data, digital access codes, and/or physical access devices. Further detail about the application server (118) is provided in FIG. 3.

In one or more embodiments of the invention, the database server (120) is a computing system with functionality to store identities used to authenticate inmates, outsiders, administrators, reviewers, and/or investigators. Such identities may include verified data used to compare to verification data provided by the inmate, outsider, administrator, reviewer, or investigator to authenticate the inmate, outsider, administrator, reviewer, or investigator.

In one or more embodiments of the invention, the database server (120) also stores communication data about communications between an inmate and an outsider or visitor. Such communication data may include, for example, a recording of a video call, the length of a voice call, the frequency of video calls, sent and received text messages, etc. The database server (120) may also store media submitted to a secure social network before, during, and/or after the media has been reviewed. Further detail about the database server (120) is provided in FIG. 3.

In one or more embodiments of the invention, the third party providers (104) are computing systems that provide network application and data storage services (i.e., cloud computing services). Third party providers (104) may include service providers used directly by inmates and outsiders, such as photo sharing services, general social networking sites, and digital music retailers. Third party providers (104) may include service providers employed by administrators and for use by inmates and outsiders, such as audio and video streaming applications, conferencing applications, and secure social network media storage. One or more of the components within the third party providers (104) may alternatively be located within the controlled facility (100) or the outside facility (102).

In one or more embodiments of the invention, the media server (122) is a computing system or group of computing system with functionality to provide network application services to facilitate communication between an inmate and an outsider, and to facilitate access to a secure social network. Such services include, but are not limited to, VoIP services, video conferencing services, and media streaming services.

In one or more embodiments of the invention, the web server (124) is a computing system or group of computing system with functionality to provide an interface to access and interact with webpages and other network application services. In one or more embodiments of the invention, the web server (124) is a type of media server (122).

In one or more embodiments of the invention, the datacenter (126) is a computing system or group of computing system with functionality to provide an interface to access and interact with data stored on one or more data servers (not shown). In one or more embodiments of the invention, the datacenter (126) is a type of media server (122).

In one or more embodiments of the invention, the outsider computing device (106) is a computing device with functionality to execute the outsider application (128). In one or more embodiments of the invention, the outsider computing device (106) is a mobile computing device (e.g., a smartphone, a laptop, a tablet, etc.). Further detail about the outsider computing device (106) is provided in FIG. 6.

In one or more embodiments of the invention, the outsider application (128) is a process or group of processes (in software, firmware, hardware, or combination thereof) with functionality to enable communication between an outsider and an inmate. Specifically, the outsider application (128) may be used to send or receive text messages and/or initiate or receive voice or video calls. In one or more embodiments of the invention, the outsider application (128) also enables an outsider to access a secure social network. Specifically, the outsider application (128) may be used to upload media to, or view media from, a secure social network account of the outsider, an inmate, other secure social network member.

Figure 2:
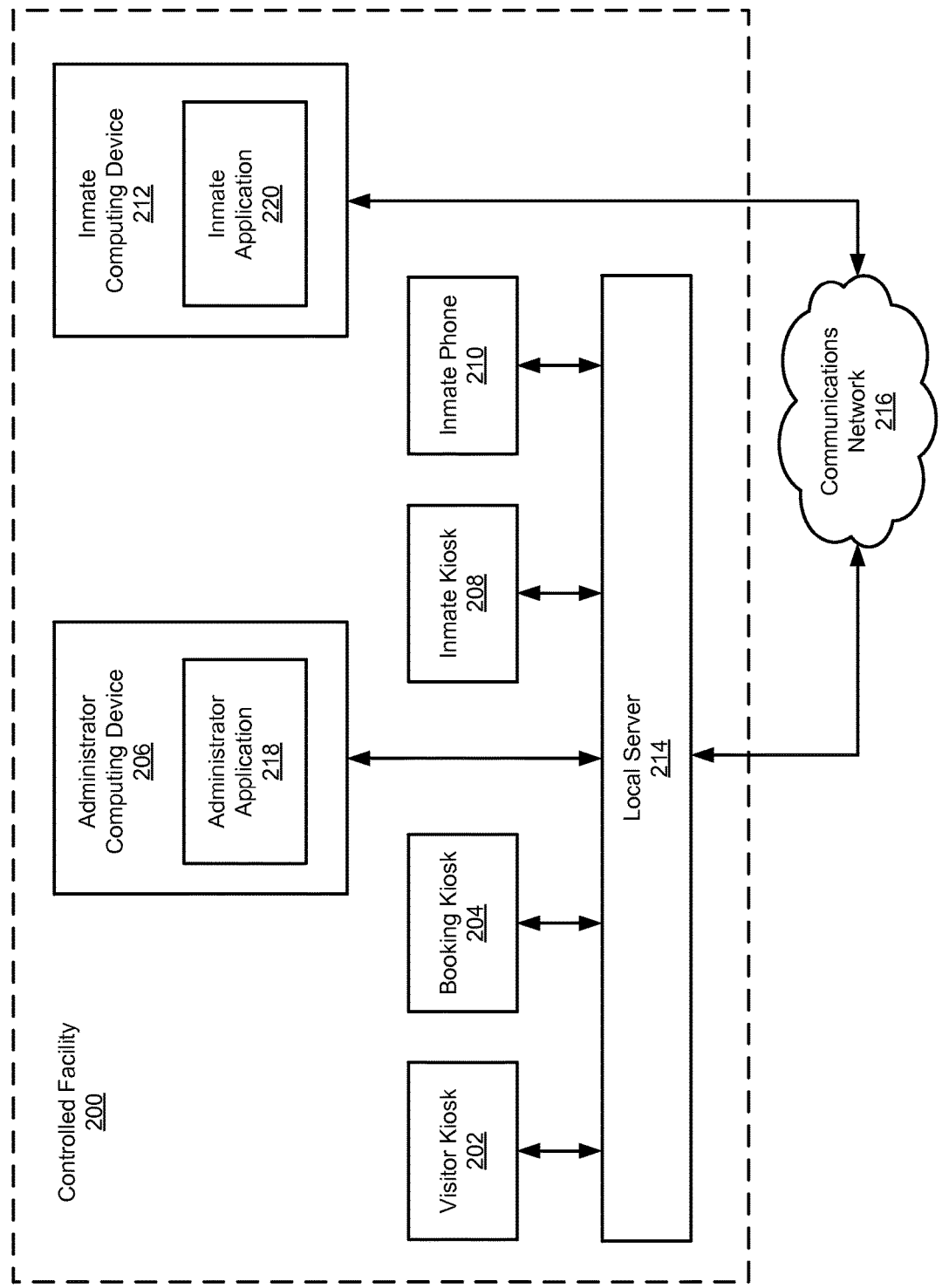

FIG. 2 shows a controlled facility in accordance with one or more embodiments of the invention. As shown in FIG. 2, the controlled facility (200) may include a visitor kiosk (202), a booking kiosk (204), an administrator computing device (206), an inmate kiosk (208), an inmate phone (210), an inmate computing device (212), and a local server (214). The inmate computing device (212) and the local server (214) are communicatively coupled to the communications network (216). The administrator computing device (206) includes an administrator application (218). The inmate computing device (212) includes an inmate application (220).

In one or more embodiments of the invention, the visitor kiosk (202) is a computing system with functionality to facilitate communication between an inmate and a visitor. Specifically, the visitor kiosk (202) may be a combination of computing hardware and software used by a visitor to make and receive voice and video calls to/from an inmate residing in the same controlled facility (200) or another controlled facility (not shown). The visitor kiosk (202) may also be used to schedule a voice or video call with an inmate for a future date. Further, the visitor kiosk (202) may also include the functionality to exchange media (e.g., photos, videos, and audio) with an inmate residing in the controlled facility (200). The visitor kiosk (202) may include functionality to generate such media, such as a camera, microphone, keyboard, and software to record or otherwise create media to send to an inmate. Such media may be subject to review before being delivered.

In one or more embodiments of the invention, a visitor wanting to use a visitor kiosk (202) may be required to participate in an authentication process to verify the identity of the visitor. The authentication process may include creating an identity data item and verified data for storage and later comparison. The verified data used for authentication may be a username and password combination and/or biometric information about the visitor.

In one or more embodiments of the invention, the visitor kiosk (202) includes functionality to access a secure social network. Specifically, the visitor kiosk (202) may be used by a visitor to create and manage a secure social network account. The visitor kiosk (202) may also be used by a visitor to upload digital media to the visitor's secure social network account or the account of another secure social network member. The visitor kiosk (202) may further be used to view digital media uploaded to the visitor's social network account or the account of another secure social network member.

In one or more embodiments of the invention, the visitor kiosk (202) includes functionality to manage a commissary account for one or more inmates. Specifically, a visitor may use a visitor kiosk (202) to add money to the commissary account of an inmate in the controlled facility (200), view a transaction history of the commissary account, transfer funds between commissary accounts, and/or remove funds from a commissary account. Further detail about the visitor kiosk (202) is provided in FIG. 5A and FIG. 5B.

In one or more embodiments of the invention, the booking kiosk (204) is a computing system with functionality to aid administrators in admitting an inmate into a controlled facility (e.g., controlled facility (200)). Specifically, the booking kiosk (204) may include functionality to create or update an inmate identity data item. Specifically, the booking kiosk (204) may be used to obtain verified data (e.g., passwords, biometric data, etc.) and save the verification data in one or more identity data items for the inmate. The verified data may then be used to authenticate the inmate (e.g., to access the communications network (216), etc.). In one or more embodiments of the invention, the booking kiosk may also be used to associate one or more restrictions with the inmate via the inmate's identity data item.

In one or more embodiments of the invention, the booking kiosk (204) includes functionality to input contact information for visitors, outsiders, administrators, or other inmates with whom the inmate wants to communicate. Such contact information may then be associated with the inmate's identity data item, and may be used to initiate a voice or video call, or otherwise transmit media to visitors, outsiders, or other inmates. Further, In one or more embodiments of the invention, the contact information may be retrieved from an inmate's mobile computing device (e.g., cell phone, smart phone, etc.) or a local or remote data storage device (e.g., a flash drive, a webmail account, etc.). The contact information may be retrieved using a wired or wireless connection between the booking kiosk and the inmate's mobile computing device and/or the data storage device. The contact information may be subject to review before the inmate is permitted to contact the visitor, outsider, administrator, or other inmate.

In one or more embodiments of the invention, the booking kiosk (204) includes functionality to prepare a mobile computing device for use by the inmate within the controlled facility (200). Specifically, a controlled facility (200) may allow inmates the use of computing devices while in or subject to the controlled facility (200). However, use of such inmate computing devices may require that the computing device is instrumented with software restricting the use of the inmate computing device. The booking kiosk (204) may be used to instrument the inmate computing device as required. Further detail about the booking kiosk (204) is provided in FIG. 5A and FIG. 5B.

In one or more embodiments of the invention, the administrator computing device (206) is a computing system or group of computing systems with functionality to execute the administrator application (218). In one or more embodiments of the invention, the administrator application (218) is a process or group of process with functionality to provide access to communications between inmates at the controlled facility (200) and visitors, outsiders, administrators, and other inmates. The administrator application (218) may also be used to monitor current voice or video calls between an inmate and a visitor, outsider, administrator, or other inmate.

In one or more embodiments of the invention, the administrator application (218) is used to manage an identity data item associated with an inmate. Such management may include altering the restrictions (device use restrictions, inmate use restrictions, and inmate target restrictions) applicable to the inmate. In one or more embodiments of the invention, the administrator application (218) is used to access the secure social network account of an inmate, visitor, or outsider. In one or more embodiments of the invention, the administrator application (218) may provide heightened access (i.e., a level of access greater than that of the inmate, visitor, or outsider) to data stored in the secure social networking account.

In one or more embodiments of the invention, the inmate kiosk (208) is a computing system with functionality to facilitate communication between an inmate and a visitor or outsider. Specifically, the inmate kiosk (208) may be a combination of computing hardware and software used by an inmate to make and receive voice and video calls to/from a visitor, outsider, or another inmate residing in another controlled facility (not shown). The inmate kiosk (208) may also be used to schedule a voice or video call with a visitor at a future date. Initiating or scheduling a voice or video call may include determining whether the currently attempted call or the scheduled call are adverse to one or more restrictions (e.g., inmate use restrictions, device use restrictions, and/or inmate target restrictions). Further, the inmate kiosk (208) may also include the functionality to exchange media (e.g., photos, videos, and audio) with a visitor or outsider. The inmate kiosk (208) may include functionality to generate such media, such as a camera, microphone, keyboard, and software to record or otherwise create media to send to a visitor or outsider. Such media may be subject to review before being delivered.

In one or more embodiments of the invention, an inmate wanting to use an inmate kiosk (208) may be required to participate in an authentication process to verify the identity of the inmate. The authentication process may include providing verification data for comparison to verified data previously obtained from the inmate and stored in the inmate identity data item. The verified data may be a username and password combination and/or biometric information about the inmate.

In one or more embodiments of the invention, the inmate kiosk (208) includes functionality to access a secure social network. Specifically, the inmate kiosk (208) may be used by an inmate to manage a secure social network account. The inmate kiosk (208) may include functionality to generate such media, such as a camera, microphone, keyboard, and software to record or otherwise create media to send to a visitor or outsider. The inmate kiosk (208) may also be used by an inmate to upload digital media to the inmate's secure social network account or the account of another secure social network member. The inmate kiosk (208) may further be used to view digital media uploaded to the inmate's social network account or the account of another secure social network member. Uploaded media may be subject to review before posting.

In one or more embodiments of the invention, the inmate kiosk (208) includes functionality to manage a commissary account for the inmate. Specifically, an inmate may use an inmate kiosk (208) to view a transaction history of the commissary account and/or to apply commissary funds for goods and services consumed or enjoyed by the inmate. Further detail about the inmate kiosk (208) is provided in FIG. 5A and FIG. 5B.

In one or more embodiments of the invention, the inmate phone (210) is a device with functionality to send and receive audio communications between an inmate and an outsider or visitor. The inmate phone (210) may be implemented as handset connected to a telephone line. In one or more embodiments of the invention, all or part of the voice call may be conducted over a VoIP connection. In one or more embodiments of the invention, a single inmate phone (210) is utilized by multiple inmates.

In one or more embodiments of the invention, initiating or receiving a voice call using the inmate phone (210) requires a form of authentication (e.g., providing a password, personal identification number, or voice verification). In one or more embodiments of the invention, voice calls made using the inmate phone (210) are monitored by one or more administrators using the administrator computing device (206), and are recorded and stored in a data storage system within the controlled facility (200), within the outside facility (not shown), or within a third party provider (not shown). The inmate phone (210) may also be subject to device use restrictions limiting the ability to use the inmate phone (210) at certain times (e.g., between 9 PM and 8 AM) or under certain conditions (e.g., emergency lockdown).

In one or more embodiments of the invention, the identity of the visitor or outsider targeted by the inmate or attempting to contact the inmate using the inmate phone (210) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In one or more embodiments of the invention, the inmate computing device (212) is a computing system configured to execute the inmate application (202). In one or more embodiments of the invention, each inmate computing device (212) is utilized exclusively by a single inmate. In one or more embodiments of the invention, access to the inmate application requires a form of initial authentication. This initial authentication may use verification data stored locally on the inmate computing device (212) (e.g., a code or combination used to unlock the phone, locally stored biometric data, etc.).

In one or more embodiments of the invention, accessing a communications network (e.g., communications network (216)) using the inmate application (220) may require further network-based authentication. This further authentication may use verification data stored external to the inmate computing device (212) but locally within the controlled facility (200), or remotely within the outside facility (not shown) or within a third party provider (not shown).

In one or more embodiments of the invention, an authenticated inmate may use the inmate application to initiate or receive voice or video calls, initiate or receive text or media messages, schedule a voice or video call, manage a commissary account, or post media to a secure social network. In one or more embodiments of the invention, voice and video calls made using the inmate computing device (212) are monitored by one or more administrators using the administrator computing device (206), and are recorded and stored in a data storage system within the controlled facility (200), within the outside facility (not shown), or within a third party provider (not shown).

In one or more embodiments of the invention, the identity of the visitor or outsider targeted by the inmate or attempting to contact the inmate using the inmate computing device (212) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In one or more embodiments of the invention, the inmate computing system (212) and/or the inmate application (220) may limit access to the communications network (216) based on one or more restrictions (inmate use restrictions, inmate target restrictions, and device use restrictions). Further, the inmate computing system (212) and/or the inmate application (220) may gather data from input devices of the inmate computing system (212) to determine whether one or more restrictions apply. Such input devices may include, for example, a system clock, a global positioning system antenna, a wide area network antenna, etc.

In one or more embodiments of the invention, the local server (214) is a computer system or group of computers systems located within the controlled facility (200) that facility communication between inmates and visitors, outsiders, and/or other inmates. Specifically, the local server (214) may implement the software necessary to host voice and video calls between and among the visitor kiosk (202), the inmate kiosk (208), the inmate phone (210), and an outsider computing system (not shown). The local server (214) may also include functionality to enforce communication restrictions associated with the inmates using the inmate kiosk (208) or inmate phone (210). Alternatively, the local server (214) may merely provide access to other systems capable of hosting the communication software and data storage (e.g., located within an offsite facility or a third party provider). Further, In one or more embodiments of the invention, the local server (214) includes functionality to regulate inmate access to a secure social network.

Figure 3:
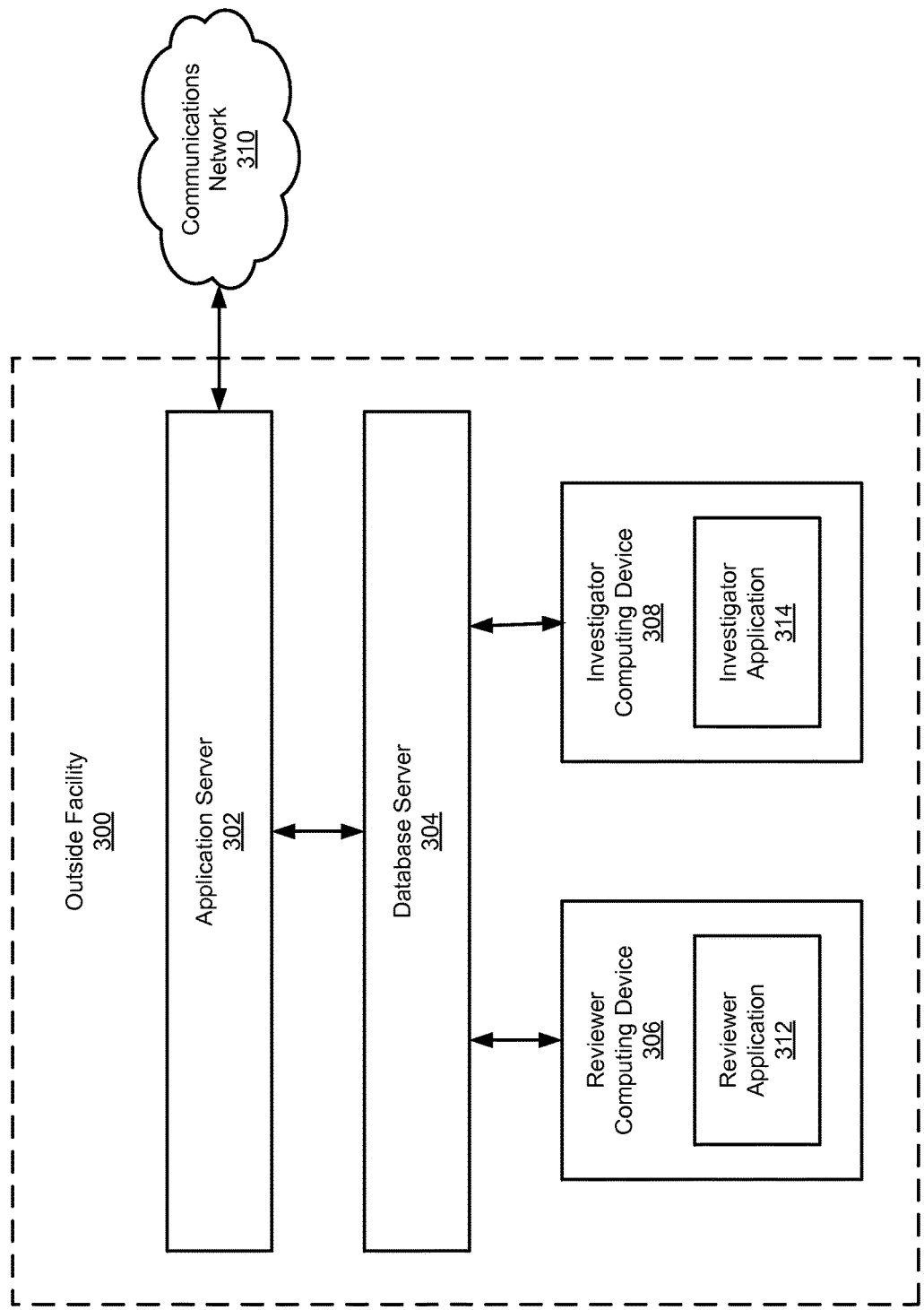

FIG. 3 shows an outside facility in accordance with one or more embodiments of the invention. As shown in FIG. 3, the outside facility (300) may include an application server (302), a database server (304), a reviewer computing system (306), and an investigator computing system (308). The application server (302) is communicatively coupled to the communications network (310). The reviewer computing device (306) may include a reviewer application (312), and the investigator computing device (308) may include an investigator application (314).

In one or more embodiments of the invention, the application server (302) is a computing system or group of computing systems configured to authenticate inmates, visitors, outsiders, administrators, reviewers, and/or investigators. Specifically, the application server (302) includes functionality to receive a request to authenticate an inmate, visitor, outsider, administrator, reviewer, and/or an investigator, retrieve verified data associated with the request, and compare the verified data to verification data submitted in the authentication request. In one or more embodiments of the invention, the application server provides access to identity data items and other data stored in the database server (304).

In one or more embodiments of the invention, the database server (304) is a computing system or group of computing system configured to store data about inmates, visitors, outsiders, administrators, reviewers, and/or investigators as well as communication data describing communications between and among inmates, visitors, outsiders, administrators, reviewers, and/or investigators. Data stored in the database server may include, but is not limited to, identity data items, verified data, approved communication media, communication media pending review In one or more embodiments of the invention, the reviewer computing device (306) is a computing system configured to execute the reviewer application (312). In one or more embodiments of the invention, a reviewer is a person charged with viewing a media item submitted by an inmate, visitor, outsider or administrator, and determining one or more attributes of the media item. Based on the determined attributes of the media item, the reviewer may then approve the media item for transmission to its target inmate, visitor, or outsider. Alternatively, the reviewer may reject the media item, conditionally approve the media item, or redact parts of the media item, thus preventing complete transmission to its target inmate, visitor, or outsider. In one or more embodiments of the invention, the reviewer application (312) include functionality to view media items, associate one or more attributes to the media item, and/or mark the media items as approved or rejected.

In one or more embodiments of the invention, the investigator computing device (308) is a computing system configured to execute the investigator application (314). In one or more embodiments of the invention, an investigator is a person gathering information about an inmate, visitor, or outsider generally for the purposes of law enforcement. The investigator application (314) includes functionality to provide access to data stored on the database server (304) for investigative purposes.

Figure 4:
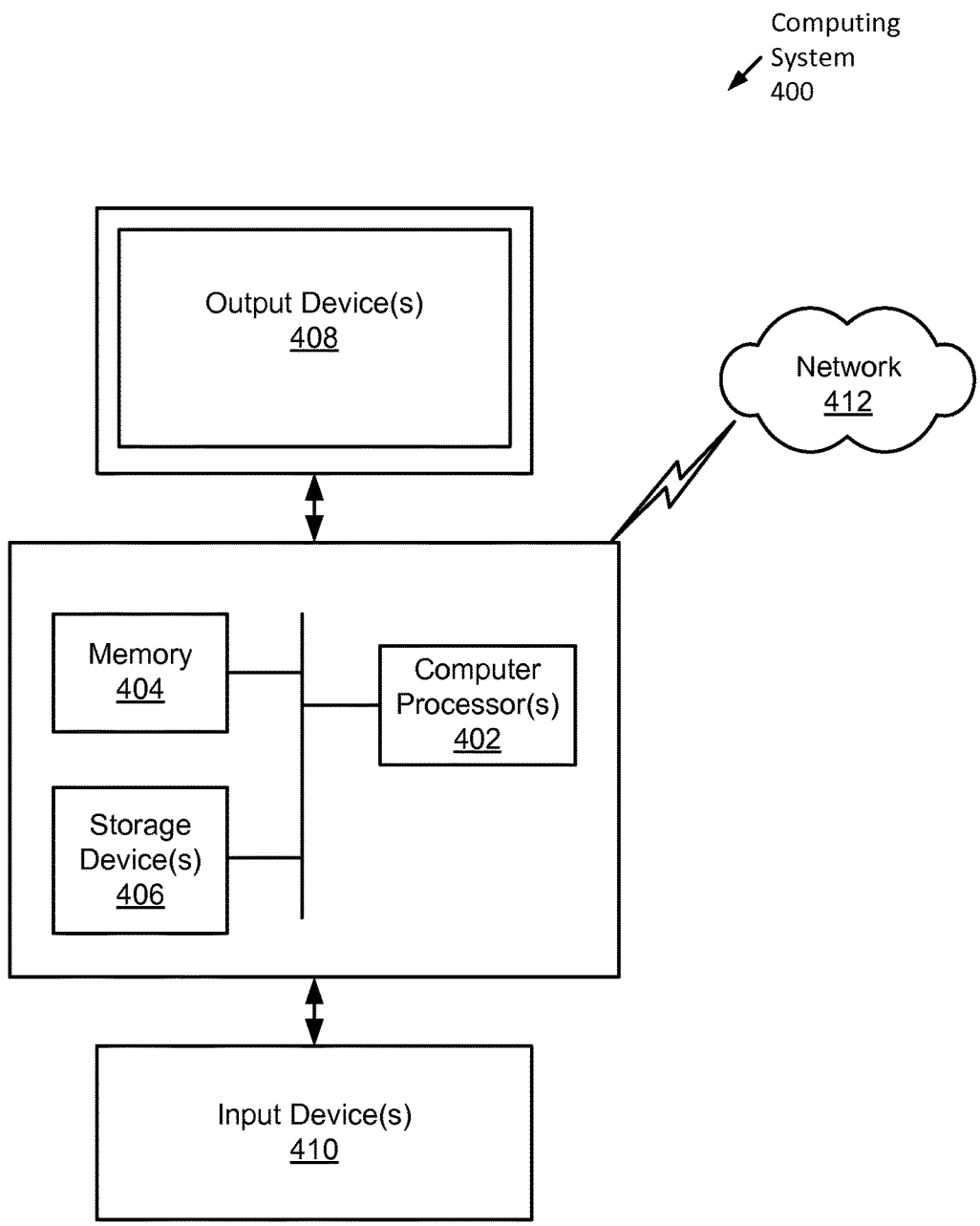

FIG. 4 shows a general computing system in accordance with one or more embodiments of the invention. As shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, camera, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (414). Further, embodiments of the invention may be implemented on a distributed system having a plurality of nodes, where each portion of the invention may be located on a different node within the distributed system. In one or more embodiments of the invention, the node corresponds to a distinct computing device. Alternatively, the node may correspond to a computer processor with associated physical memory. The node may alternatively correspond to a computer processor or micro-core of a computer processor with shared memory and/or resources.

Figure 5A:
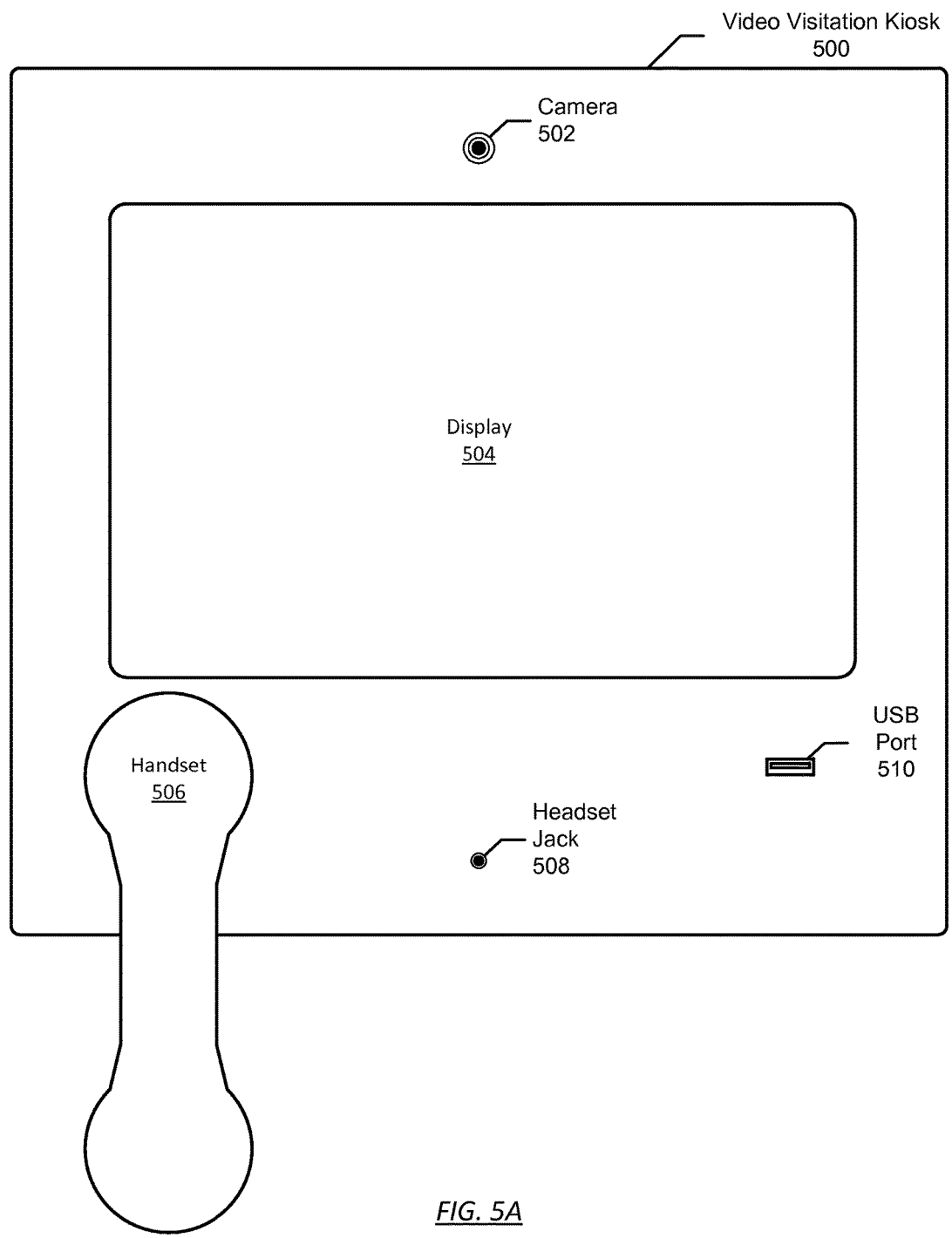

FIG. 5A shows a video visitation kiosk in accordance with one or more embodiments of the invention. Specifically, the video visitation kiosk (500) is a type of computing device as described in FIG. 4. As shown in FIG. 5A, the video visitation kiosk (500) includes a camera (502), a display (504), a handset (506), a headset jack (508), and a universal serial bus (USB) port (510).

Figure 5B:
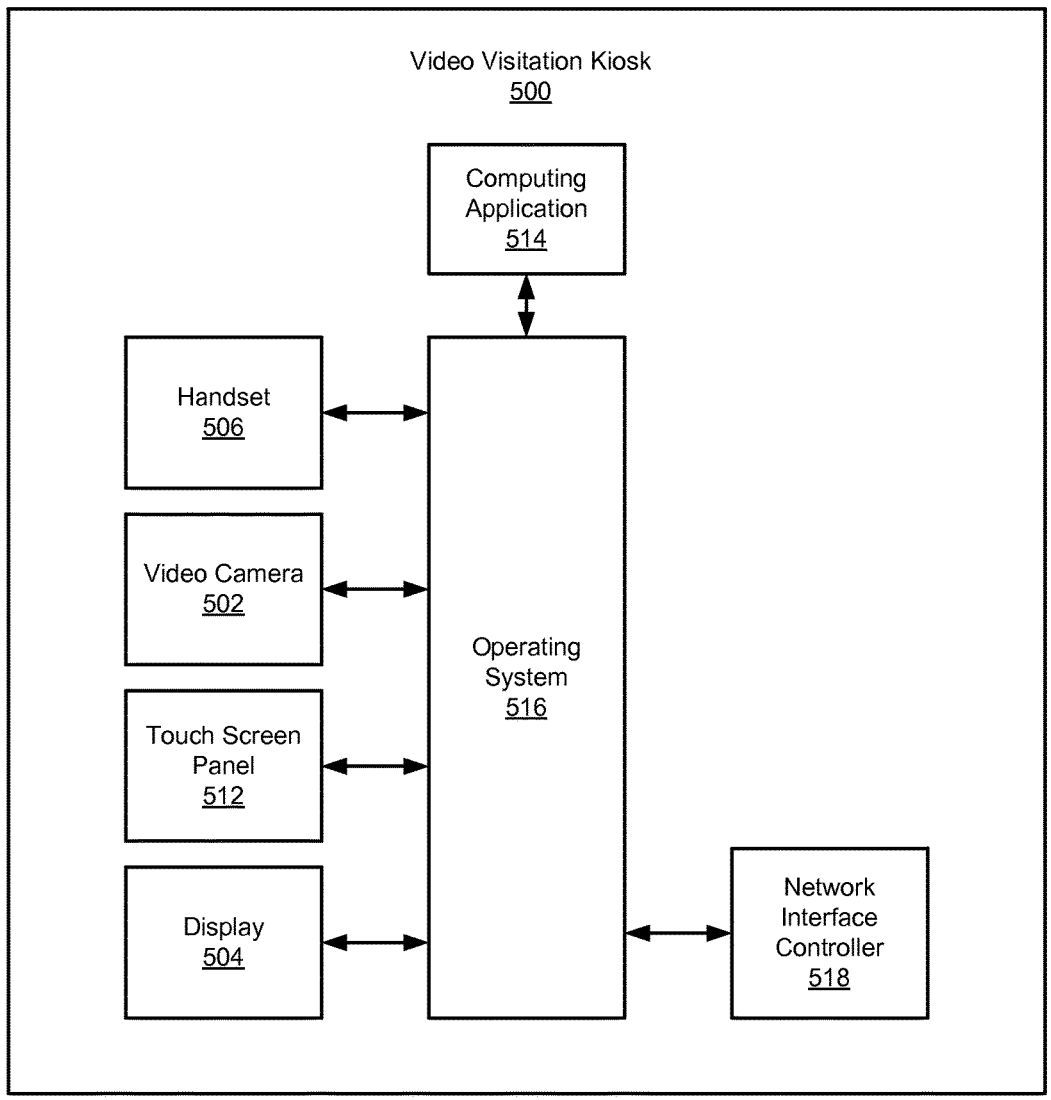

FIG. 5B shows the hardware and software elements of a video visitation kiosk in accordance with one or more embodiments of the invention. The hardware and software elements shown in FIG. 5B may be in addition to the elements described in FIG. 4. As shown in FIG. 5B, the video visitation kiosk (500) includes a handset (506), a video camera (502), a touch screen panel (512), a display (504), a computing application (514), an operating system (516), and a network interface controller (518).

Figure 6:
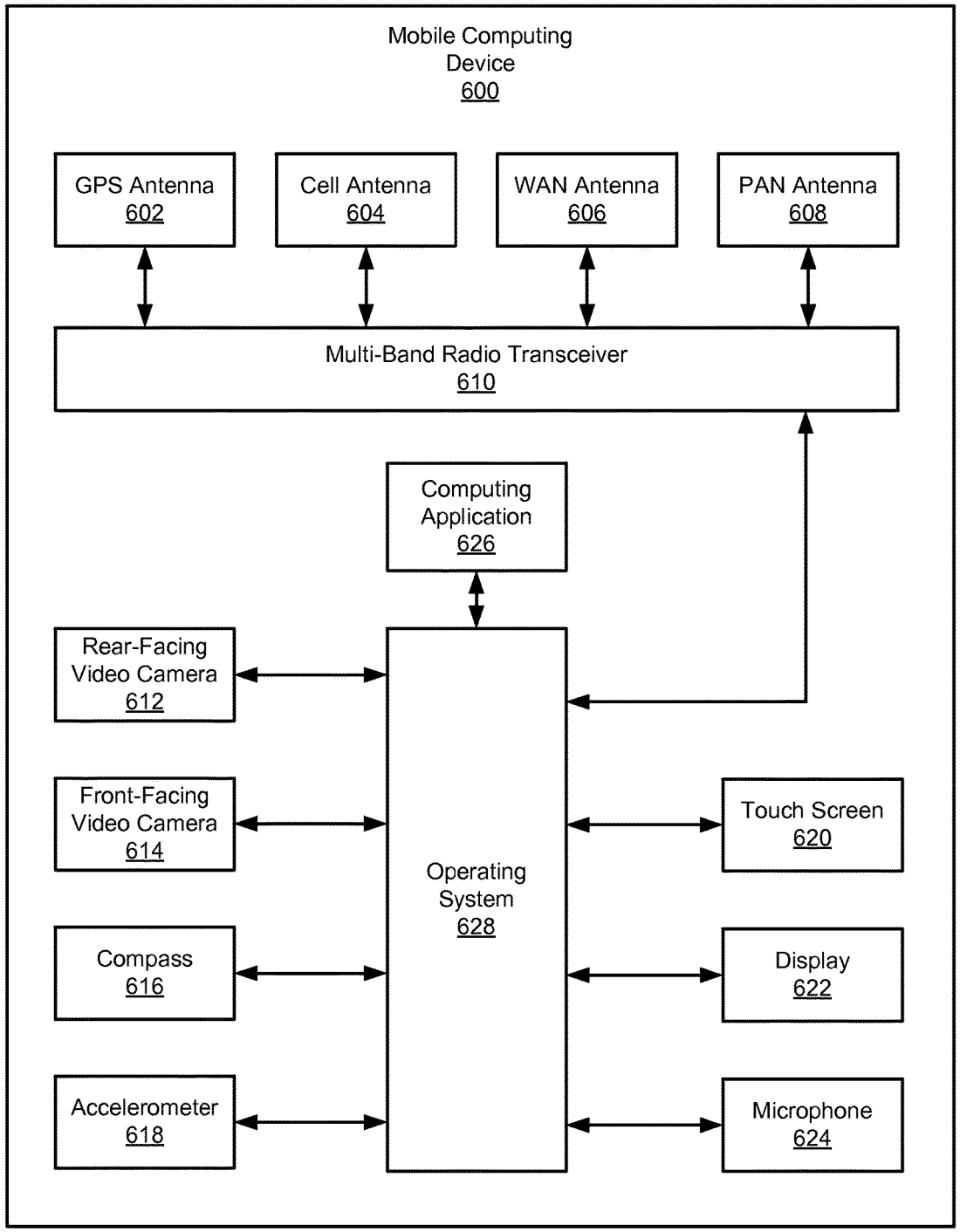

FIG. 6 shows the hardware and software elements of a mobile computing device in accordance with one or more embodiments of the invention. Specifically, the mobile computing device (600) is a type of computing device as described in FIG. 4. The hardware and software elements shown in FIG. 6 may be in addition to the elements described in FIG. 4.

As shown in FIG. 6, the mobile computing device (600) may include a global positioning system (GPS) antenna (602), a cell antenna (604), a wide area network (WAN) antenna (606), and a personal area network (PAN) antenna (608), each connected to a multi-band radio transceiver (610). The mobile computing device (600) also may include a rear-facing video camera (612), a front-facing video camera (614), a compass (616), an accelerometer (618), a touch screen (620), a display (622), and a microphone (624). The mobile computing device (600) also may include a computing application (626) executing on an operating system (628).

Figure 7:
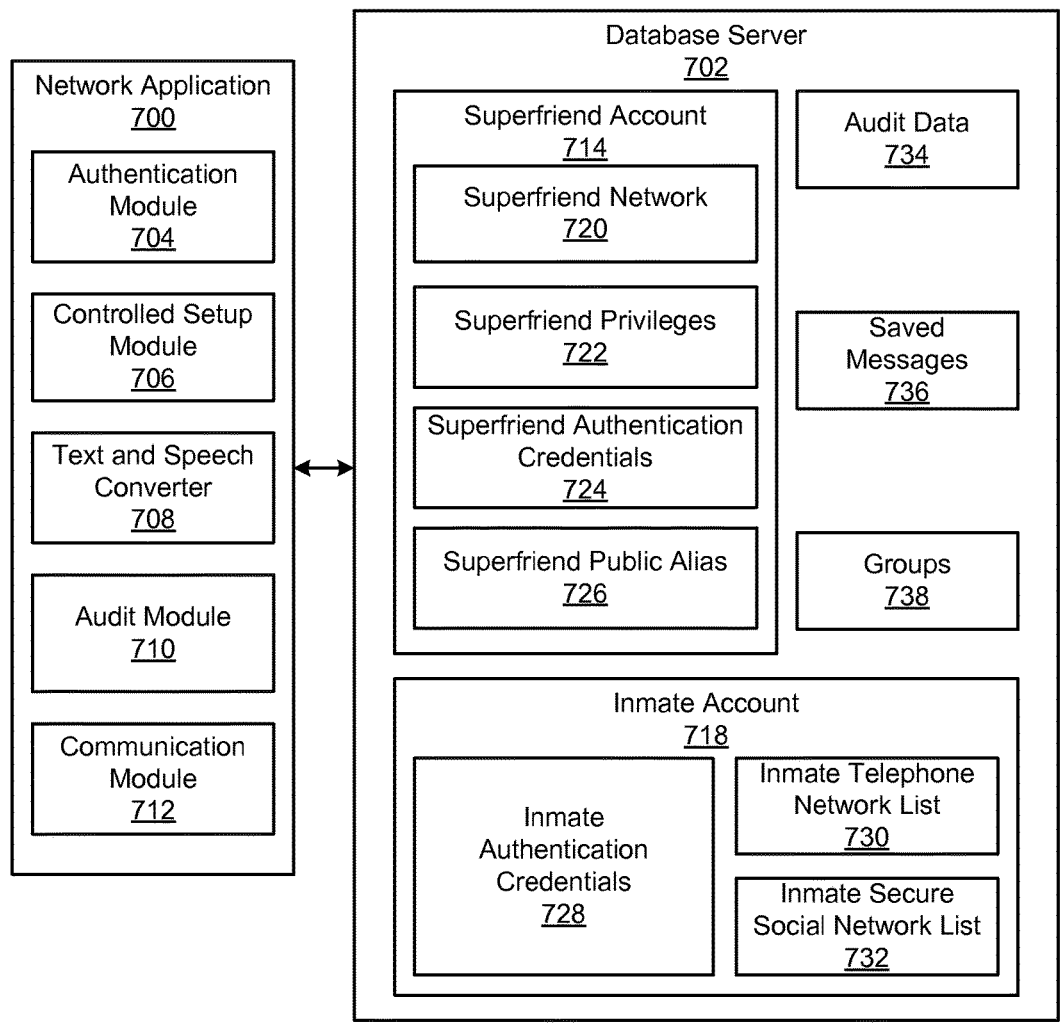

FIG. 7 shows a schematic diagram of a system including a network application (700) and a database server (702). The network application (700) may execute or be a part of application server (118) in FIG. 1. Similarly, the database server may be database server (120) in FIG. 1. Alternative configurations may also be used. For example, either, both, or part of the network application (700) and database server (702) may be located in the controlled facility. The network application (700) and database server (702) are discussed below.

A network application (700) is a software application for connecting inmates and administrators to a network. For example, the network may be a telephone network (not shown) or a secure social network (not shown). The network application may include an authentication module (704), a controlled setup module (706), a text and speech converter (708), an audit module (710), and a communication module (712). Each of these components is discussed below.

An authentication module (704) includes functionality to authenticate individuals to the desired network. For example, the authentication module may include functionality to receive authentication credentials, and determine whether the authentication credentials match stored credentials for the individual. The authentication credentials may be user name, password, voiceprint authentication, face verification information, identifying body marks and features information, retina verification information, palm or fingerprint verification information, or any other type of credential for authentication.

In one or more embodiments of the invention, the controlled setup module (706) includes functionality to create an account (e.g., inmate account (718), superfriend account (714)) for an individual. The controlled setup module (706) may further include functionality to populate the account with contacts, and update the account. Populating an inmate account (718) with contacts and updating the inmate account (718) are discussed with reference to FIGS. 8-10.

Continuing with FIG. 7, in one or more embodiments of the invention, the text and speech converter (708) includes functionality to convert textual input into audio output. The text and speech converter (708) may further include functionality to convert audio input to textual output. Further, the text and speech converter (708) may further include functionality to convert one audio input into a second audio input. For example, consider the scenario in which an administrator would like to transmit an anonymous message, such as deliver bad news. In such a scenario, the text and speech converter (708) may include functionality to replace an administrator's voice with a computerized audio. For example, the computerized audio may be a computer voice speaking the administrator's spoken words or manipulation of the sounds of the administrator's voice.

In one or more embodiments of the invention, the audit module (710) includes functionality to track communications from inmates. Specifically, the audit module (710) includes functionality to track, calculate, and store messages, timestamps defining when the message was transmitted, when the message was received, the length of time in which the message was being presented, a unique identifier of the communication device (e.g., inmate kiosk, inmate phone, inmate computing device) used to receive the message, any response to the message, and other tracking information about a message.

In one or more embodiments of the invention, the communication module (706) includes functionality to manage a communication on a network. For example, the communication module (706) may include functionality to identify an individual accessing the network, receive a connection request to connect to a contact, and connect the individual to the contact when the contact is in the individual's network list. The term, list, as used in this application refers to any data structure for storing a collection of contacts. The communication module (706) may further include functionality to connect the individual to all social network contacts via the secure social network. In one or more embodiments of the invention, the communication module (706) may facilitate oversight of an inmate's communication by transmitting all or a portion of the messages to an administrator or reviewer for approval.

The communication module (706) may further include functionality to track the length of time that an inmate is communicating on the selected network and/or a number of messages sent and/or received on the selected network. A payment module (not shown) may include functionality to obtain payment from the inmate or a contact of the inmate and disperse the payment. For example, dispersing the payment may include transmitting at least a portion of the payment to a controlled facility and/or transmitting a portion to a network management entity (e.g., telephone connection company, internet connection company) and/or retaining at least a portion. The payment module may include functionality to debit an inmate's money account or otherwise bill the inmate based on the amount of time, number of messages, or other information.

Continuing with FIG. 7, the network application (700) is operatively connected to the database server (702). The database server (702) includes functionality to store information for the network application (700). For example, the database server (702) may store one or more superfriend accounts (714), an inmate account (718) for each inmate, audit data (734), saved messages (736), and groups (738). Each of the stored data is discussed below.

A superfriend account (714) is an account maintained for an administrator who is a superfriend of an inmate. A superfriend is a person, typically and administrator, contacts and communications from whom an inmate is not permitted to block, reject, or unfriend in accordance with one or more embodiments of the invention. For example, the superfriend may be a warden, guard, parole officer, counselor, doctor, investigator, or other individual. In one or more embodiments of the invention, a superfriend has superfriend privileges (722) over an inmate account (718) and has removal protection from the inmate account (718). In one or more embodiments of the invention, superfriend privileges may correspond to administrative privileges. Superfriend privileges (722) include being able to transmit any information to an inmate and having the transmission on the conspicuously placed or presented when the inmate accesses the network. Further, superfriend privileges (722) may include privilege to review all correspondence to and from the inmate. Additional superfriend privileges may exist without departing from the scope of the invention. In one or more embodiments of the invention, an inmate cannot limit the superfriend privileges.

Removal protection refers to an inability for an inmate to unfriend the superfriend. Specifically, without proper authority, which an inmate does not have, the superfriend cannot be disassociated from the inmate's network.

In one or more embodiments of the invention, the superfriend account (714) further includes a superfriend network list (720), superfriend authentication credentials (724), and at least one superfriend public alias. The superfriend network list (720) includes a list of contacts with whom the superfriend may communicate. A contact refers to an individual or group of individuals with whom a person is connected. For example, the contact may include a network identifier of an individual and connection information for connecting to the individual.

Superfriend authentication credentials (724) are authentication credentials used for authenticating the administrator. The superfriend authentication credentials (724) may include user name, password, voiceprint authentication, face verification information, identifying body marks and features information, retina verification information, palm or fingerprint verification information, or any other type of credential for authentication.

In one or more embodiments of the invention, a superfriend public alias (726) is an alternative identifier for the administrator that is presented as the sender and/or recipient of messages. For example, if the administrator is transmitting a message anonymously, the anonymous communication may be under the public alias. By way of another example, if the administrator is performing a communication for a particular group (e.g., the entire controlled facility, a group of prisons, a counseling group), the administrator may use the public alias of a group name to send and receive messages.

Continuing with the database server (702), an inmate account is an account storing information about an inmate. For example, an inmate account may include inmate authentication credentials (728), an inmate telephone network list (730), and an inmate social network list (732). Additionally, although not shown in FIG. 7, the inmate account may also include administrative information, such as name, birthdate, inmate identifier, reason for the inmate to be in the controlled facility, historical confinement of the inmate, list of inmate's violations of regulations of the controlled facility, gang affiliations, account balance for payment of communications, and other information.

The inmate authentication credentials (728) correspond to authentication credentials for the inmate. For example, the authentication credentials may include user name, password, voiceprint authentication, face verification information, identifying body marks and features information, retina verification information, palm or fingerprint verification information, or any other type of credential for authentication.

The inmate telephone network list (730) corresponds to a list of contacts of the inmate for communication via the telephone network. The inmate secure social network list (732) corresponds to a list of contacts of the inmate for communication via a secure social network. In one or more embodiments of the invention, before being allowed to communicate with the contacts, the contacts must be approved. Further, although an inmate may communicate with contacts in the inmate telephone network list and the inmate secure social network list, the contacts may not be approved in accordance with one or more embodiments of the invention. Specifically, the inmate telephone network list and the inmate secure social network list may include unprocessed contacts, filtered contacts, and/or approved contacts.

An unprocessed contact is a contact that has not been vetted or checked to determine whether communication with the unprocessed contact is prohibited. A filtered contact is a contact that is not outright prohibited for communication. An approved contact is a contact that has been vetted and with whom the inmate may communicate. For example, unprocessed contacts may be filtered to remove contacts that are known gang members, are inmates, are wanted criminals, or have other attributes, which make communication with such contacts outright prohibited. In one or more embodiments of the invention, the filtering process may include comparing the contact with lists of prohibited people. In some embodiments, the remaining contacts after the filtering processed are approved contacts. In alternative embodiments, filtered contacts may have to be vetted (e.g., go through an identification and/or approval process) to be approved contacts. The vetting may include performing background checks on the contact and confirming the identity of the contact. In one or more embodiments of the invention, rules of the controlled facility define whether filtered contacts must be vetted in order for the inmate to communicate with the approved contacts. Whether a contact is an unprocessed contact, filtered contact, or approved contact may be maintained as an attribute defined for the contact in the inmate account.

Although FIG. 7 shows the secure social network list (732) as separate and distinct from the telephone network list (730), the secure social network list (732) may be the same as the telephone network list (730). Further, in one or more embodiments of the invention, the inmate may have a single contact list. Each contact in the single contact list may have a parameter indicating whether the inmate may communicate with the contact via telephone network, secure social network, or both. For example, the parameter may be a set bit and/or connection identifiers (e.g., telephone number, secure social network identifier) for the contact.

Continuing with the discussion regarding the database server (702), the audit data (734) includes information stored for auditing purposes. For example, for each message, the audit data may include timestamps defining when the message was transmitted, when the message was received, the length of time in which the message was being presented, a unique identifier of the communication device used to receive the message, any response to the message, and other tracking information about a message.

Saved messages (736) correspond to messages that are saved. For example, saved messages may include postings to the inmate secure social network, voicemail messages, one to one messages, multicast or broadcast messages, and other messages.

In one or more embodiments of the invention, groups relate a group identifier to account identifiers of individuals who are members of the group. For example, for a counseling group, the counseling group identifier is related to the counselor superfriend account identifier along with inmates who participate in the counseling session. By way of another example, for a controlled facility group, the controlled facility group identifier may be related to all inmates in the controlled facility. Thus, a communication sent to a group identifier will be broadcasted to all members of the group in one or more embodiments of the invention.

Although FIG. 7 shows a certain configuration of components, other configurations may be used without departing from the scope of the invention. For example, the super-friend account (714) may be located on an application. By way of another example, one or more modules of the network application (700) may be located in a different component of the system.

Figure 8:
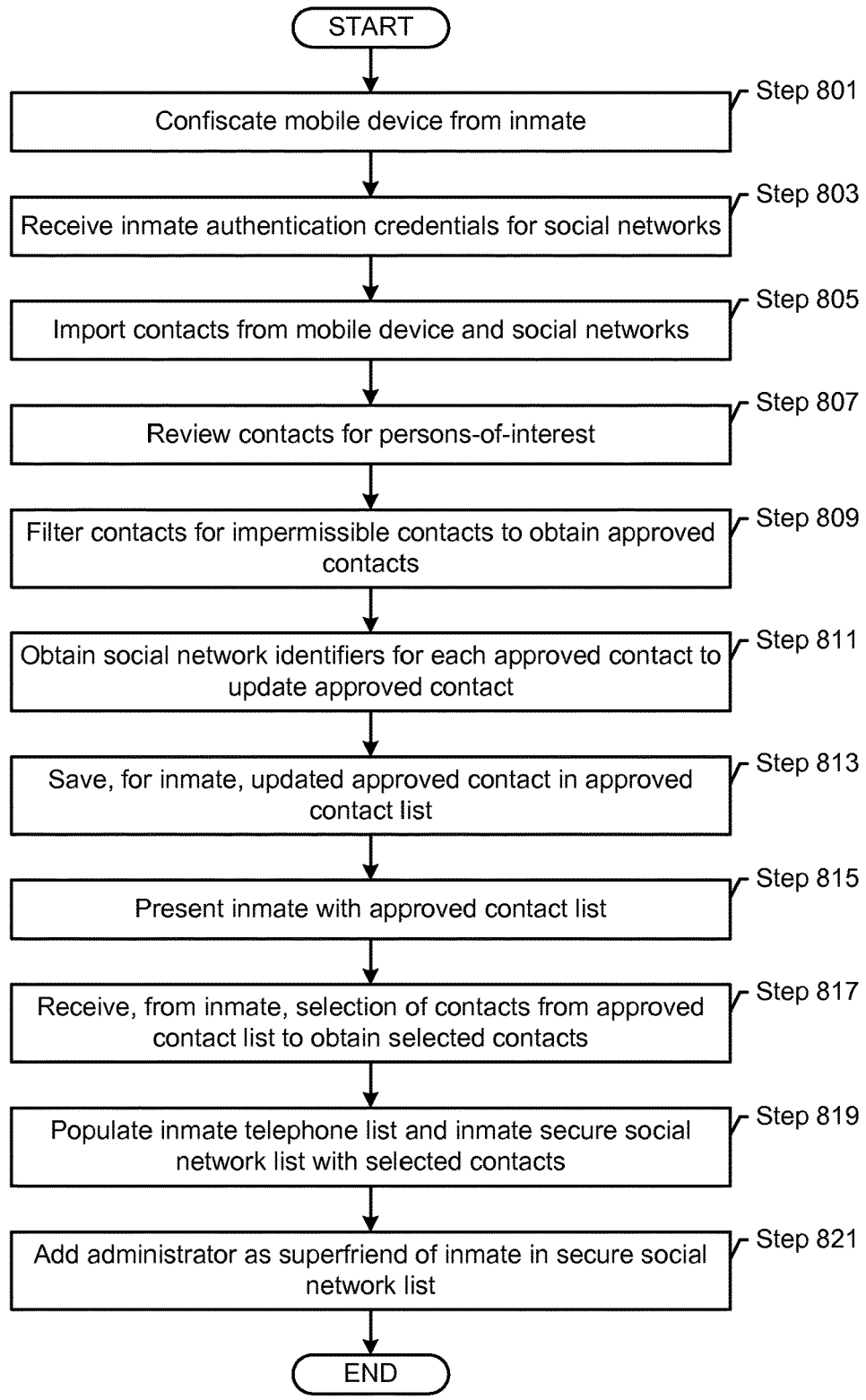
FIGS. 8-10 show flowcharts of a method in one or more embodiments of the invention.
Figure 9:
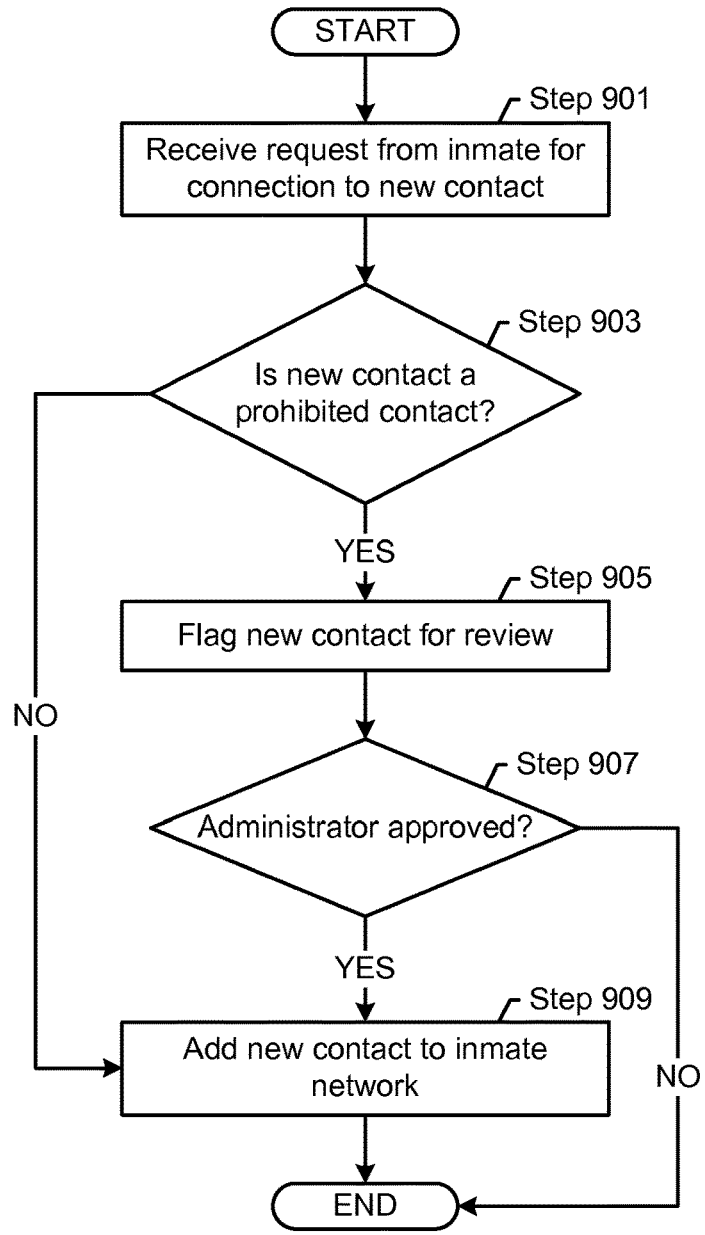
Figure 10:
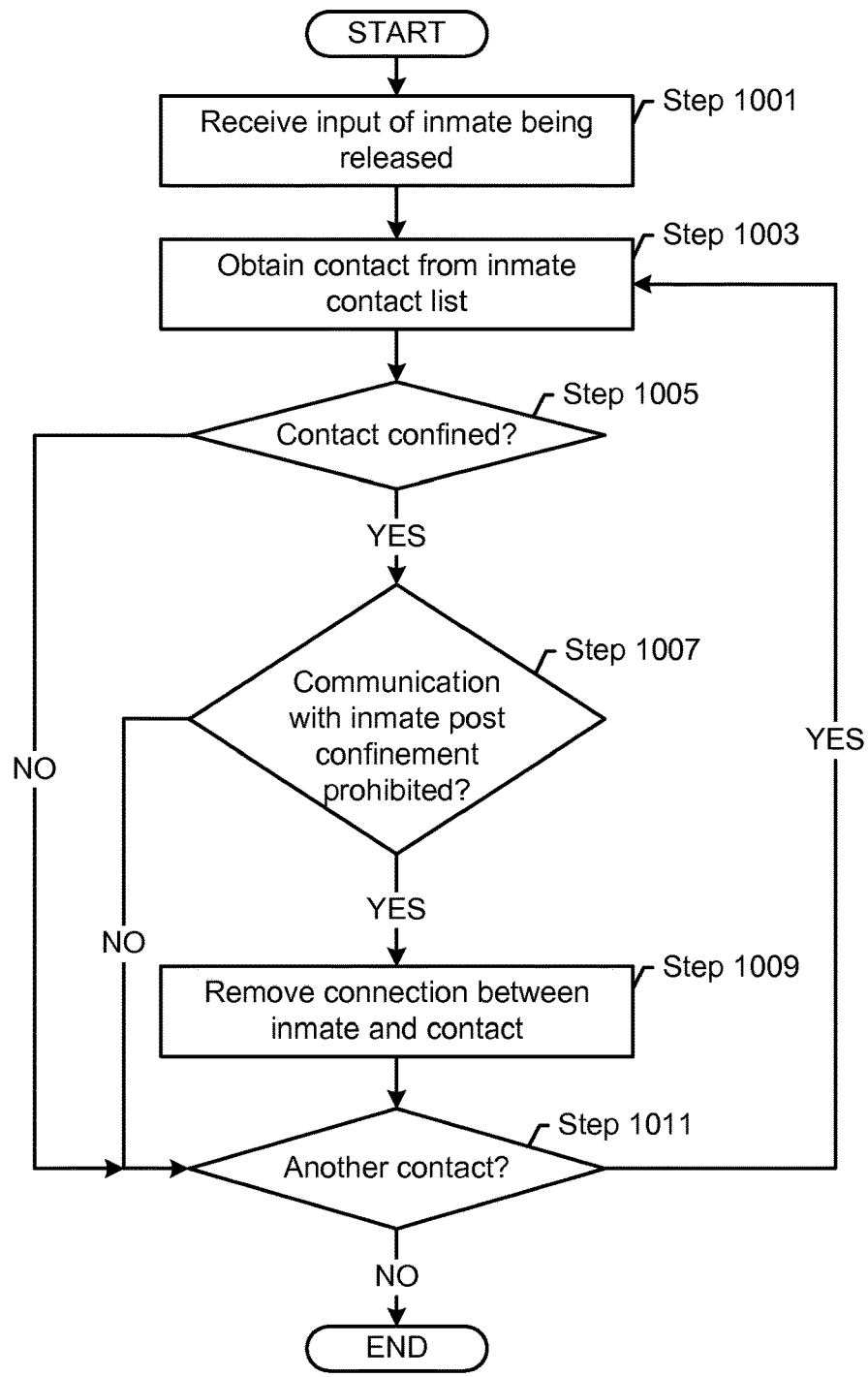

FIGS. 8-10 show flowcharts in one or more embodiments of the invention. While the various steps in these flowcharts are presented and described sequentially, some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 8 shows a flowchart for priming a network of an inmate in one or more embodiments of the invention. In Step 801, the mobile device of the inmate is confiscated in one or more embodiments of the invention. In one or more embodiments, when an inmate is confined, the inmate may be stripped of the inmate's possessions. For example, all communication devices found on the inmate or in the inmate's belongings may be removed. The removal may be temporary, such as during a booking process, or semi-permanent, such as during the entire period of an inmate's confinement.

In Step 803, inmate authentication credentials for social networks are received in one or more embodiments of the invention. In one or more embodiments of the invention, the inmate provides his or her authentication credentials. Rather than providing authentication credentials to third party social network, the inmate may provide the credentials to an administrator. In other words, in one or more embodiments of the invention, the inmate is not allowed to access the inmate's third party social network once confinement of the inmate is initiated. Providing authentication credentials may be optional for the inmate. Specifically, the inmate may opt out of importing contacts from third party social networks. In such a scenario, the steps discussed below regarding importing contacts from the social network may be omitted.

In Step 805, contacts are imported from the inmate's mobile device and social networks in one or more embodiments of the invention. Specifically, third party social networks are accessed using the inmate's authentication credentials provided in Step 803. The contacts are extracted from the inmate's account on the third party's social network. Alternatively, contacts from the inmate's third party social network may be imported without input from the inmate. For example, a court order to the third party may require the third party to release a list of contacts of the inmate on the third party social network or the court order may require release of the authentication credentials to allow for automatic crawling and download.

Further, in one or more embodiments of the invention, contacts are downloaded from the inmate's mobile device. Importing contacts may be performed using extraction software. If the inmate has a passcode, the passcode may be overridden in order to extract the contacts.

In Step 807, the contacts are reviewed for persons of interest in one or more embodiments of the invention. For example, contacts may be reviewed to identify missing witnesses, individuals with warrants out for arrest, and other individuals. Reviewing contacts may be performed by a reviewer application comparing the contacts with one or more person of interest list. For example, the reviewer application may compare contacts against state and federal warrant lists to determine whether a contact has a warrant out for his or her arrest. By way of another example, the reviewer application may compare the contacts with a list of individuals connected to an inmate's confinement and flag the contacts that match. The reviewer application may transmit any matching contacts to a reviewer. For example, the reviewer may be an administrator. By way of an example, the reviewer may be an investigator that is managing the inmate's case.

In Step 809, contacts are filtered for prohibited contacts to obtained approved contacts in one or more embodiments of the invention. In one or more embodiments of the invention, filtering contacts includes determining which contacts with whom the inmate is outright not allowed to communicate with and saving the remainder of the contacts as filtered contacts. Depending on the rules of the controlled facility, vetting of the filtered contacts may be performed to obtain approved contacts. The vetting may be performed at this stage, when the inmate requests communication with the contact, or at another time. Alternatively, once the contacts are filtered, the remaining contacts may be deemed approved. For example, the contacts may be filtered to remove other inmates, known gang members, and witnesses. The contacts may further be filtered to remove individuals confined in the same and/or different controlled facility. Filtering the contacts may include the setup module comparing the contacts with one or more lists of prohibited contacts. Such lists may include a list of known gang members, a list of jury members, a list of judges, a list of witnesses, and any other lists. After the contacts are filtered, the remaining contacts may be transmitted to a reviewer application for a reviewer to view the contacts. The reviewer may determine whether any of the remaining contacts are prohibited and remove any prohibited contacts. The resulting contacts from the filtering may be referred to as approved contacts. Alternatively, the resulting contacts may be subject to more vetting to be approved contacts.

In Step 811, social network identifiers for each contact are obtained to update the contacts in one or more embodiments of the invention. Specifically, in one or more embodiments of the invention, one or more contacts that are obtained from an inmate's mobile device may not be associated with a third party social network in the inmate's mobile device. In such a scenario, the third party social networks are accessed with contact information, such as the name of the contact, to obtain the contact's social network identifier. Thus, not only is the inmate able to communicate with the contact via a telephone network, but also with the contact via the secure social network even when the inmate does not have a network identifier for the contact. If the contact is found in the third party social network, an updated contact is created.

In Step 813, the updated contact is saved in the approved contact list for each updated contact in one or more embodiments of the invention. Specifically, the update to the contact is saved.

In Step 815, the inmate is presented with a contact list in one or more embodiments of the invention. Presenting the inmate with the contact list may be performed during a booking process or afterwards, such as once the inmate is confined. For example, the inmate may be presented with telephone network contacts via the inmate phone or kiosk described above. In the example, the first time that the inmate uses the inmate phone or kiosk, the inmate may be presented with options for setting up an inmate account to access the social network. The inmate may be presented with a list of all contacts, unprocessed contacts, filtered contacts, or a combination thereof. In one or more embodiments of the invention, the filtering and vetting process may be performed before or after the inmate requests communication with the contact.

In Step 817, a selection of contacts from the contact list is received from the inmate to obtain selected contacts in accordance with one or more embodiments of the invention. In one or more embodiments, the inmate selects the contacts with which the inmate would like to communicate while confined. By allowing the inmate to select contacts, the inmate can determine the contacts with which the inmate would like to communicate while confined. Further, embodiments prevent the inmate from accessing unapproved contacts.

In Step 819, the inmate telephone list and the inmate secure social network list are populated with the selected contacts in accordance with one or more embodiments of the invention. In one or more embodiments of the invention, once populated, the inmate is enabled to communicate with any contact in the inmate telephone list and the inmate secure social network list. In one or more embodiments of the invention, the inmate may request communications with any contacts. The requested communication may require an approval process.

In Step 821, an administrator is added as a superfriend of the inmate in accordance with one or more embodiments of the invention. In one or more embodiments of the invention, the administrator is selected based on a relationship (or lack thereof) with the inmate. For example, the administrator may be a warden, an investigator, a guard, or another individual. By adding the administrator as superfriend, the administrator may review all messages from and to the inmate. Thus, the administrator may ensure that the messages comply with regulations. For example, the administrator may ensure that the inmate is not receiving crime reports, participating in a crime, communicating with gang members, plotting to receive or send contraband, or performing any other such acts. By way of another example, the administrator may gather evidence and other intelligence from messages to and from the inmate.

In one or more embodiments of the invention, when the inmate wants to use the telephone network, the inmate may access the inmate phone or kiosk. Using the inmate phone or kiosk, the inmate may authenticate him or herself to the telephone network. The inmate may be presented with the inmate's telephone network list. Alternatively, the inmate may select a speed dial number or graphical image for a particular contact in the inmate's telephone contact list. If the contact is in the inmate telephone network, the inmate is connected to the contact. The communication module and audit module may begin recording information, such as a contact identifier of the contact, a time and date of the communication, length of time for the communication, and a recording of the communication.

To access the inmate secure social network, the inmate may authenticate him or herself to the secure social network. The inmate may begin sending and/or receiving messages with the secure social network. The messages may be broadcasted to all of the inmate secure social network contacts, multi-casted to a subset of the inmate secure social network contacts, or uni-casted to a single secure social network contact. Each message or a subset thereof may be reviewed by the administrator before or after being transmitted.

In one or more embodiments of the invention, the inmate voluntarily or involuntarily provides, to the network application, his or her authentication credentials for an application providing an outside social network. The network application executing the secure social network may use the authentication credentials to connect to the outside social network. The network application may communicate with the outside social network using an Application Programming Interface (API) of the outside social network. Social data transmitted from the outside social network to the network application may be buffered and analyzed prior to being presented to the inmate in accordance with one or more embodiments of the invention.

For instance, the inmate might request access to specific photo libraries (by name) or all photo libraries and other content. The network application processes the request by downloading the requested content and storing the content in a review queue that is tagged and filtered by automated systems and/or by human reviewers. The resulting content that is tagged and filtered is provided to the inmate. Thus, the inmate will eventually obtain access to none, some, or all of the requested content depending on the outcome of the review queue.

In one or more embodiments of the invention, the network application imports photos from the outside social network, regardless of whether the inmate is allowed to view them, may analyze the photos with facial and object recognition software. The network application may search for biometric matches between the faces in the imported photos and biometric data already known by the system. For example, the biometric data may be from individuals appearing in video visitations or otherwise recognized from other imported photos. In some cases, facial recognition is not used, such as in the case where the imported photos have already been tagged in the outside social network with identities. The network application may compare the identities from the photos with individuals known by the system. For example, individuals known to the system may include current and former inmates, and current and former contacts of the inmates made through telephone calls, video visitations, secure social networking, and other communications channels whose records are available to the system.

In one or more embodiments of the invention, social network contacts may be obtained as follows. The inmate may be presented with all contacts, but only a subset of the data, such as name, residence location, and profile photo. Some data, such as address, telephone number, email address, or social network identifier may be redacted. Based on the subset of data, the inmate then select which contacts that the inmate would like to communicate with from within the controlled facility. The selected contacts, along with the information withheld from the inmate, may be placed in a review queue analogous to the image review queue. In one or more embodiments of the invention, social network contacts associated with the inmate are then available to the system. By being available, the investigators, administrators, and software routines in the system may compare the imported contacts to lists of individuals with whom the inmate is prohibited from communicating. In one or more embodiments of the invention, any contacts matching, or appearing to match, the inmate's prohibited contact list are flagged for review. The investigator or administrator may make a determination of whether to allow or disallow communications with each requested contact.

One or more embodiments may perform social network crawling using the inmate's contacts. For example, the social network crawling may be performed to look for connections with other inmate users of the network application, connections with gang members or criminals, connections with controlled facility administrators, investigators, or other law enforcement officials, connections with people communicating with other inmates, and other connections. The connections may be direct or indirect connections (e.g., through a third party). Further, the number of connections between the inmate and the individual may correspond to the degree of the connection, which may be stored with the information. For example, the inmate may have a second degree connection with an investigator, where the second degree connection is through a family member of the inmate and a friend of the investigator.

In one or more embodiments of the invention, when the inmate connects to an outside social network through the network application, the inmate may be guided through an enrollment process. During the enrollment process, the inmate may provide a new username if the inmate does not already have one to the outside social network. The network application may create a new account for the inmate on the outside social network.

In one or more embodiments of the invention, the network application may search databases and search engines using data provided by the inmate during enrolment. For example, if the inmate specifies his or her own account name, the system uses a search engine to determine whether the inmate specified username is used elsewhere. If other accounts with the same username are publicly accessible, or are accessible to other users of the same system, the system may log into these systems with an account of its own, perhaps as an automated proxy for a specific investigator at the facility, so as to access any data available. The available data, or in some cases, the account name alone, may be enough for investigators with sufficient cause to obtain a court order or subpoena to access additional information about these accounts and each account's list of connections. Thus, if an inmate specifies a username that the inmate has used in other online activities, investigators may obtain information about the other online activities.

One or more search engines may perform searching based on individuals and/or content matching information describing, or obtained from the inmate during his booking and/or enrollment. For example, if the inmate states his name as John Smith, age 51, residing in Long Beach, Calif., and among the first telephone calls he makes is to a number associated with a Susan Smith, age 49, also residing in Long Beach, Calif., the system may conclude that the two individuals are related, and perform additional searches based on this perceived first-degree connection. The search may be performed using a graph search or other search methods. Also, using only the inmate's claimed name, residence, and age, the system may perform a lookup using search engines such as MyLife.com, PeekYou.com, Pipl.com, ZoomInfo.com, and/or Spokeo.com, which all offer the ability to search for individuals based on scant submitted information.

Also, using any online account names associated with the inmate, that the inmate either provided or were derived from the above searches, additional online sites are searched for users with any of those same usernames, such as online dating sites. Additionally, the most commonly used dating sites are searched for profiles with attributes matching those attributes obtained from the system and that describe the inmate, including height, weight, age, hair color, eye color, and distinguishing features such as tattoos. The searches may be conducted not only for the specific values obtained or given, but for ranges above and below these values, to account for lies that dating site users may make.

FIG. 9 shows a flowchart for updating the inmate's network in one or more embodiments of the invention. Specifically, FIG. 9 shows a flowchart for when an inmate wants to add a contact. In Step 901, a request for connection to a new contact is received from the inmate in accordance with one or more embodiments of the invention. In one or more embodiments of the invention, the inmate may provide contact information, such as name, connection identifier (e.g., telephone number, third party social network identifier), and other information for the new contact.

In Step 903, a determination is made whether the new contact is a prohibited contact. Determining whether the contact is a prohibited contact may be performed similar to the discussion above with respect to filtering contacts in Step 809 of FIG. 8. Additionally, determining whether the new contact is a prohibited contact may include confirming that the name of the contact matches the connection identifier. Specifically, confirming that the name matches the connection identifier ensures that the inmate is not attempting to access an unauthorized individual.

If the new contact is a prohibited contact, the new contact is flagged for review in Step 905 in one or more embodiments of the invention. Flagging the new contact for review may include sending a notification to the administrator. The notification may include contact information provided by the contact and the reason for flagging the contact (e.g., the basis for the contact being a prohibited contact). For example, a notification may be added to the superfriend account of the administrator. The administrator may be presented with the notification when the administrator logs into the administrator account or the administrator may receive an automated electronic communication, such as a text message. Alternatively, a non-superfriend, such as a reviewer may be notified of the new contact.

In Step 907, a determination is made whether an administrator approved the contact in one or more embodiments of the invention. Specifically, the administrator may select to override the prohibition of the contact. In such a scenario, the administrator may select that the contact is approved in the network application. If the administrator approves of the contact or if the new contact is not a prohibited contact, then the new contact is added to the inmate network in Step 909 in one or more embodiments of the invention. Once added, the inmate may begin communicating with the new contact.

FIG. 10 shows a flowchart for managing a release of the inmate in one or more embodiments of the invention. Specifically, in one or more embodiments, the release of an inmate may limit who the inmate may contact. For example, released inmates may be prohibited from contacting currently confined inmates. In Step 1001, input of an inmate being released is received in one or more embodiments of the invention. In one or more embodiments of the invention, the system may receive a notification that the particular inmate is being released.

In Step 1003, contact from the inmate contact list is obtained in one or more embodiments of the invention. In Step 1005, a determination is made whether the contact is confined in a controlled facility of some type in accordance with one or more embodiments of the invention. Specifically, if the contact is confined, then one or more regulations for communicating with the contact may apply. For example, the contact may be prohibited from communicating with the inmate and/or the inmate may be prohibited from communicating with the contact, such as by a condition of the inmate's release or other restriction set by the court.

In Step 1007, a determination is made whether communication with the inmate post-confinement is prohibited in accordance with one or more embodiments of the invention. To make the determination, the application rules defined by regulations defining with whom the inmate can communicate while released are executed. Released inmates may no longer be subject to the controlled facility. If communication with the contact by the inmate post-confinement is prohibited, then the connection between the inmate and the contact is removed in Step 1009 in accordance with one or more embodiments of the invention. Specifically, the contact is removed (e.g., deleted, blocked, hidden, etc.) from the inmate telephone network list and secure social network list. Similarly, the inmate may be removed from the contact's telephone network list and secure social network list in accordance with one or more embodiments of the invention.

In Step 1011, a determination is made whether another unprocessed contact exists in one or more embodiments of the invention. Specifically, in one or more embodiments, each contact in the inmate network list is reviewed to determine whether the inmate may communicate with the contact post-confinement. Further, for any network list in which the inmate is a contact, the communication is analyzed to determine whether the communication with the inmate is prohibited. If prohibited, the inmate is deleted from the network list in accordance with one or more embodiments of the invention.

The following example is for explanatory purposes only and not intended to limit the scope of the invention. In the following example, consider the scenario in which Jeff, recently laid-off, unwisely decides to join Ruff Gang and illegally sell cocaine to obtain money. Because Jeff has had his cell phone on him at all times, he never bothers to remember how to connect to his contacts. One day, Jeff's life of crime caught up to him, and he is arrested and booked into a controlled facility. At the jail, Jeff's cell phone is confiscated from him as part of the booking process. Jeff has absolutely no idea whom he may contact.

Continuing with the example, Jeff is in luck. The controlled facility where he is booked has a network application that is able to obtain contacts from Jeff cell phone. As part of the process, each contact in Jeff's cell phone is analyzed to determine whether Jeff is allowed to communicate with said contact. In other words, the contacts are filtered to remove prohibited contacts. Thus, contacts that are known members of Ruff Gang are removed. Further, known cocaine users who are contacts, and, and therefore, may be witnesses to Jeff's illegal activities are removed. The remaining contacts include Jeff's family members, his attorney, and a few upstanding friends. Jeff decides that he does not want some of the contacts to know that he is incarcerated. So, Jeff selects a certain set of contacts to be in his network list and leaves the remaining contacts unselected. The warden and assistant warden may add themselves as superfriend of Jeff to review his communications.

Thus, although Jeff did not remember any of his contacts when he was booked into the controlled facility, he is still able to communicate with his contacts. Further, in accordance with certain embodiments of the invention, the contacts he has in his network list are confirmed to be those individuals with whom he may communicate without violating regulations or restrictions. Additionally, one or more embodiments allow for oversight of Jeff's messages to ensure that the messages do not violate regulations going forward.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for network priming for an inmate of a controlled facility, comprising: receiving authentication credentials for the inmate to access a third party social network; importing, via an application programming interface (API) provided by the third party social network, a plurality of social network contacts from the third party social network, wherein importing the plurality of social network contacts comprises performing social network crawling to identify at least one individual indirectly connected to the inmate with a degree of connection more than 1, and wherein the degree of the connection is a number of connections between the inmate and the individual; filtering the plurality of social network contacts for prohibited contacts; presenting the inmate with the plurality of social network contacts; receiving, from the inmate, a selection of social network contacts from the plurality of social network contacts to obtain a plurality of selected social network contacts; populating a secure social network list of the inmate with the plurality of selected social network contacts; downloading, from the third party social network via the API, content of the inmate using the authentication credentials, the content comprising a plurality of photos that are buffered pending analysis, wherein at least one of the plurality of photos is tagged with an identity by the third party social network; analyzing the plurality of photos in the content to identify a plurality of individuals in the plurality of photos, wherein analyzing the plurality of photos comprises: comparing the plurality of photos with a plurality of current and former inmates in the controlled facility to identify the plurality of individuals; investigating the inmate using the plurality of individuals identified from the plurality of photos in the content and the at least one individual from social networking crawling; filtering the content; and presenting the filtered content to the inmate.

2. The method of claim 1, further comprising: importing a plurality of mobile device contacts from a mobile device used by the inmate; filtering the plurality of mobile device contacts for prohibited contacts; presenting the inmate with the plurality of mobile device contacts; receiving, from the inmate, a selection of mobile device contacts from the plurality of mobile device to obtain a plurality of selected telephone contacts; and populating a telephone list of the inmate with the plurality of selected telephone contacts.

3. The method of claim 2, further comprising: obtaining a social network identifier for at least one contact in the plurality of telephone contacts; and populating the plurality of social network contacts with the social network identifier for the at least one contact.

4. The method of claim 2, further comprising: reviewing the plurality of mobile device contacts for persons-of-interest; and notifying an administrator when a person-of-interest is found in the plurality of mobile device contacts.

5. The method of claim 2, further comprising: authenticating the inmate for telephone communication; receiving, in response to authenticating the inmate, a connection request to communicate with a telephone contact; and connecting, via a telephone network, the inmate to the telephone contact when the telephone contact is in the telephone list of the inmate.

6. The method of claim 1, further comprising: adding an administrator to the secure social network list of the inmate; and providing the administrator with an administrative privilege and a removal protection from the secure social network list.

7. The method of claim 1, further comprising: receiving a request from an inmate for a connection to a new contact; flagging, based on a determination that the new contact is a prohibited contact, the new contact to obtain a flagged contact; and presenting the flagged contact to an administrator for approval.

8. The method of claim 1, further comprising: receiving a notification of a release of the inmate; and for each contact in the secure social network list of the inmate: removing, based on the release, a connection between the inmate and the contact when communication with the contact post confinement is prohibited.

9. The method of claim 8, wherein removing the connection comprising: removing the contact from the secure social network contact list of the inmate; and removing the inmate from a secure social network contact list of the contact.

10. The method of claim 1, further comprising: authenticating the inmate for secure social network communication; and connecting, via a secure social network, the inmate to the secure social network list when the inmate is authenticated.

11. The method of claim 1, wherein comparing the plurality of photos with the plurality of current and former inmates in the controlled facility to identify the plurality of individuals comprises: searching for a biometric match between a face in at least one photo of the plurality of photos and biometric data of the plurality of current and former inmates, if the photo is not tagged with an identity by the third party social network.

12. A system for network priming for an inmate of a controlled facility, comprising: a computer processor; a database server comprising an inmate account, wherein the inmate account comprises a secure social network list; a network application executing on the computer processor and comprising: a controlled setup module configured to: receive authentication credentials for the inmate to access a third party social network; import, via an application programming interface (API) provided by the third party social network, a plurality of social network contacts from the third party social network, wherein importing the plurality of social network contacts comprises performing social network crawling to identify at least one individual indirectly connected to the inmate with a degree of connection more than 1, and wherein the degree of the connection is number of connections between the inmate and the individual; filter the plurality of social network contacts for prohibited contacts; present the inmate with the plurality of social network contacts; receive, from the inmate, a selection of social network contacts from the plurality of social network contacts to obtain a plurality of selected social network contacts; populate a secure social network list in the inmate account with the plurality of selected social network contacts; download, from the third party social network via the API, content of the inmate using the authentication credentials, the content comprising a plurality of photos that are buffered pending analysis, wherein at least one of the plurality of photos is tagged with an identity by the third party social network; analyze the plurality of photos in the content to identify a plurality of individuals in the plurality of photos, wherein analyzing the plurality of photos comprises: comparing the plurality of photos with a plurality of current and former inmates in the controlled facility to identify the plurality of individuals; investigate the inmate using the plurality of individuals identified from the plurality of photos in the content and the at least one individual from social networking crawling; filter the content; and present the filtered content to the inmate.

13. The system of claim 12, wherein the inmate account further comprises a telephone network list, and wherein the controlled setup module is further configured to: import a plurality of mobile device contacts from a mobile device used by the inmate; filter the plurality of mobile device contacts for prohibited contacts; present the inmate with the plurality of mobile device contacts; receive, from the inmate, a selection of mobile device contacts from the plurality of mobile device contacts to obtain a plurality of selected telephone contacts; and populate a telephone list of the inmate with the plurality of selected telephone contacts.

14. The system of claim 13, further comprising: a reviewer application configured to: review the plurality of mobile device contacts for persons-of-interest; and notify an administrator when a person-of-interest is found in the plurality of mobile device contacts.

15. The system of claim 13, further comprising: an inmate phone for connecting to a telephone network, wherein the network application further comprises: an authentication module configured to authenticate the inmate for telephone communication; and a communication module configured to: receive, in response to authenticating the inmate, a connection request to communicate with a telephone contact; and connect, using the inmate phone, the inmate to the telephone contact when the telephone contact is in the telephone list of the inmate.

16. The system of claim 12, wherein the database server further comprises a superfriend account for an administrator, and wherein the controlled setup module is further configured to: generate the superfriend account for the administrator; and add an administrator to the secure social network list of the inmate, wherein the superfriend account comprises an administrative privilege and a removal protection in the secure social network list of the inmate.

17. The system of claim 12, further comprising: an inmate kiosk for connecting to a secure social network, wherein the network application further comprises: an authentication module configured to authenticate the inmate for secure social network communication; and a communication module configured to: connect, via the secure social network, the inmate to the secure social network list when the inmate is authenticated.

18. The system of claim 12, wherein comparing the plurality of photos with the plurality of current and former inmates in the controlled facility to identify the plurality of individuals comprises: searching for a biometric match between a face in at least one photo of the plurality of photos and biometric data of the plurality of current and former inmates, if the photo is not tagged with an identity by the third party social network.

19. A non-transitory computer readable medium for network priming for an inmate of a controlled facility, the non-transitory computer readable medium comprising computer readable program code for: receiving authentication credentials for the inmate to access a third party social network; importing, via an application programming interface (API) provided by the third party social network, a plurality of social network contacts from the third party social network, wherein importing the plurality of social network contacts comprises performing social network crawling to identify at least one individual indirectly connected to the inmate with a degree of connection more than 1, and wherein the degree of the connection is number of connections between the inmate and the individual; filtering the plurality of social network contacts for prohibited contacts; presenting the inmate with the plurality of social network contacts; receiving, from the inmate, a selection of social network contacts from the plurality of social network contacts to obtain a plurality of selected social network contacts; populating a secure social network list of the inmate with the plurality of selected social network contacts; downloading, from the third party social network via the API, content of the inmate using the authentication credentials, the content comprising a plurality of photos that are buffered pending analysis, wherein at least one of the plurality of photos is tagged with an identity by the third party social network; analyzing the plurality of photos in the content to identify a plurality of individuals in the plurality of photos, wherein analyzing the plurality of photos comprises: comparing the plurality of photos with a plurality of current and former inmates in the controlled facility to identify the plurality of individuals; investigating the inmate using the plurality of individuals identified from the plurality of photos in the content and the at least one individual from social networking crawling; filtering the content; and presenting the filtered content to the inmate.

20. The non-transitory computer readable medium of claim 19, further comprising computer readable program code for: importing a plurality of mobile device contacts from a mobile device confiscated from the inmate; filtering the plurality of mobile device contacts for prohibited contacts; presenting the inmate with the plurality of mobile device contacts; receiving, from the inmate, a selection of mobile device contacts from the plurality of mobile device contacts to obtain a plurality of selected telephone contacts; and populating a telephone list of the inmate with the plurality of selected telephone contacts.

21. The non-transitory computer readable medium of claim 20, further comprising computer readable program code for: obtaining a social network identifier for at least one contact in the plurality of telephone contacts; and populating the plurality of social network contacts with the social network identifier for the at least one contact.

22. The non-transitory computer readable medium of claim 19, further comprising computer readable program code for: adding an administrator to the secure social network list of the inmate; and providing the administrator with an administrative privilege and a removal protection from the secure social network list.

* * * * *